(12) United States Patent
Gonzalez et al.

(10) Patent No.: US 12,472,637 B2
(45) Date of Patent: Nov. 18, 2025

(54) TECHNOLOGIES FOR GENERATIVE AI FOR WAREHOUSE PICKING

(71) Applicant: Intel Corporation, Santa Clara, CA (US)

(72) Inventors: Rafael de la Guardia Gonzalez, Teuchitlan (MX); David Gomez Gutierrez, Tlaquepaque (MX); Leobardo E. Campos Macias, Guadalajara (MX); Edgar Macias Garcia, Jalisco (MX); Javier Sebastian Turek, Beaverton, OR (US); Julio C. Zamora Esquivel, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 18/400,467

(22) Filed: Dec. 29, 2023

(65) Prior Publication Data
US 2025/0214248 A1    Jul. 3, 2025

(51) Int. Cl.
*B25J 9/16*    (2006.01)

(52) U.S. Cl.
CPC ........... *B25J 9/1697* (2013.01); *B25J 9/1612* (2013.01)

(58) Field of Classification Search
CPC ........ B25J 9/1697; B25J 9/1612; B25J 9/161; B25J 9/163; G06N 3/045; G06N 3/08; G06V 10/82
USPC .................. 700/245–264; 318/568.11–568.25
See application file for complete search history.

(56) References Cited

U.S. PATENT DOCUMENTS

| | | | | |
|---|---|---|---|---|
| 10,902,237 | B1* | 1/2021 | Aggarwal | G06V 10/24 |
| 10,997,491 | B2* | 5/2021 | Yao | G06N 3/045 |
| 11,318,499 | B2* | 5/2022 | Kalouche | B65G 1/1376 |
| 11,396,101 | B2* | 7/2022 | Sugiyama | B25J 9/163 |
| 11,688,160 | B2* | 6/2023 | Yao | G08G 1/16 706/17 |
| 11,774,944 | B2* | 10/2023 | Cella | G06N 3/044 700/275 |
| 11,904,468 | B2* | 2/2024 | Mizoguchi | B25J 19/023 |
| 11,958,191 | B2* | 4/2024 | Diankov | B25J 13/08 |

(Continued)

OTHER PUBLICATIONS

Chen, Shizhe, et al.; "PolarNet: 3D Point Clouds for Language-Guided Robotic Manipulation," 7th Conference on Robot Learning; Atlanta USA; 2023; 21 pages.

(Continued)

*Primary Examiner* — Jaime Figueroa
(74) *Attorney, Agent, or Firm* — Alliance IP, LLC

(57) ABSTRACT

Technologies for generative AI for warehouse picking are disclosed. In an illustrative embodiment, a robot can partially or fully autonomously perform object picking in a warehouse. A description of an object to be picked can be sent to a compute device controlling the robot. The compute device can direct the robot to move to where the object is located. The robot can then take a picture that can be analyzed. A text description as well as the image is encoded and provided to a transformer. The transformer generates an output vector indicating, e.g., where an end effector should grab hold of an object. A goal generator can then determine a pose for the end effector based on the output latent vector. A planner can move the end effector to the determined pose. A new picture can be taken, and the cycle can repeat until the item is picked.

20 Claims, 11 Drawing Sheets

(56) References Cited

U.S. PATENT DOCUMENTS

| | | | | |
|---|---|---|---|---|
| 11,977,976 | B2* | 5/2024 | Rejeb Sfar | G06N 3/0475 |
| 12,157,235 | B2* | 12/2024 | Bank | B25J 13/084 |
| 12,259,711 | B2* | 3/2025 | Cella | G06N 3/006 |
| 12,296,480 | B2* | 5/2025 | Mizoguchi | B25J 9/1664 |
| 2017/0225330 | A1* | 8/2017 | Wagner | B25J 9/1664 |
| 2018/0273296 | A1* | 9/2018 | Wagner | B25J 9/0093 |
| 2018/0282066 | A1* | 10/2018 | Wagner | G05B 19/41815 |
| 2019/0102668 | A1* | 4/2019 | Yao | G06N 3/045 |
| 2019/0171187 | A1* | 6/2019 | Cella | G06N 3/126 |
| 2019/0220744 | A1* | 7/2019 | Yao | G05D 1/0088 |
| 2019/0286990 | A1* | 9/2019 | Kenney | G06V 10/803 |
| 2019/0324439 | A1* | 10/2019 | Cella | G06N 3/042 |
| 2019/0339688 | A1* | 11/2019 | Cella | H04L 1/18 |
| 2019/0361917 | A1* | 11/2019 | Tran | H04W 12/108 |
| 2020/0070340 | A1* | 3/2020 | Kurtz | B25J 9/1664 |
| 2020/0147804 | A1* | 5/2020 | Sugiyama | G06T 7/73 |
| 2020/0319627 | A1* | 10/2020 | Edwards | G05B 19/41885 |
| 2021/0032031 | A1* | 2/2021 | Kalouche | B25J 9/162 |
| 2021/0188554 | A1* | 6/2021 | Kalouche | B07C 3/08 |
| 2022/0032454 | A1* | 2/2022 | Yang | B25J 9/1612 |
| 2022/0197255 | A1* | 6/2022 | Cella | G05B 23/0221 |
| 2022/0203540 | A1* | 6/2022 | Bank | B25J 13/003 |
| 2022/0292641 | A1* | 9/2022 | Wang | G06T 5/60 |
| 2023/0144995 | A1* | 5/2023 | Jeya Veeraiah | G06N 3/044 706/15 |
| 2024/0066698 | A1 | 2/2024 | Campos Macias | |
| 2024/0198526 | A1* | 6/2024 | Aparicio Ojea | B25J 9/1669 |

OTHER PUBLICATIONS

EPO; Extended European Search Report issued in EP Patent Application No. 24219607.9, dated May 19, 2025; 10 pages.

Qiao, Yanyuan, et al.; "March in Chat: Interactive Prompting for Remote Embodied Referring Expression," IEEE/CVF International Conference on Computer Vision (ICCV); 2023; 10 pages.

Shridhar, Mohit, et al.; "Perceiver-Actor: A Multi-Task Transformer for Robotic Manipulation," 6th Conference on Robot Learning; Auckland, New Zealand; 2022; 28 pages.

"Google-deepmind / deepmind-research" accessed Apr. 4, 2024, https://github.com/google-deepmind/deepmind-research/tree/master/perceiver, (4 pages).

"Perceiver-Actor: A Multi-Task Transformer for Robotic Manipulation" accessed Apr. 4, 2024 "https://github.com/peract/peract" (12 pages).

"PyTorch implementation of SoftFlow" accessed Apr. 4, 2024, https://github.com/ANLGBOY/SoftFlow, (3 pages).

Imtiaz, Muhammad Babar, et al. "Prehensile and Non-Prehensile Robotic Pick-and-Place of Objects in Clutter Using Deep Reinforcement Learning." Sensors, vol. 23, No. 3, Jan. 2023, p. 1513. www.mdpi.com, https://doi.org/10.3390/s23031513. (22 pages).

James, Stephen, et al. RLBench: The Robot Learning Benchmark & Learning Environment. arXiv:1909.12271, arXiv, Sep. 26, 2019. arXiv.org, https://doi.org/10.48550/arXiv.1909.12271. (8 Pages).

Lipman, Yaron, et al. Flow Matching for Generative Modeling. arXiv:2210.02747, arXiv, Feb. 8, 2023. arXiv.org, https://doi.org/10.48550/arXiv.2210.02747. (28 pages).

Winkelhaus, Sven, et al. "Hybrid Order Picking: A Simulation Model of a Joint Manual and Autonomous Order Picking System." Computers & Industrial Engineering, vol. 167, May 2022, p. 107981. ScienceDirect, https://doi.org/10.1016/j.cie.2022.107981. (17 pages).

Yang, Shusheng, et al. RILS: Masked Visual Reconstruction in Language Semantic Space. arXiv:2301.06958, arXiv, Feb. 28, 2023. arXiv.org, https://doi.org/10.48550/arXiv.2301.06958. (11 pages).

* cited by examiner

TECHNOLOGIES FOR GENERATIVE AI FOR WAREHOUSE PICKING

BACKGROUND

Order picking is a warehousing process in which products are retrieved from storage facilities to satisfy customer orders. Various types of order-picking systems are commonly used. One type is a person-to-goods system, in which order picking is performed manually with operators traveling along the aisles of the warehouse. Another type is a goods-to-person system, in which a certain quantity of the requested products is brought to the order picker's location. Another type is a hybrid order-picking system (HOPS), in which autonomous systems and human pickers work together on one shop floor for a joint target. A HOPS can provide higher throughput and lower cost per pick, but, in practice, such solutions are brittle and require extensive training to handle complex picking scenarios.

DETAILED DESCRIPTION

Figure 1:
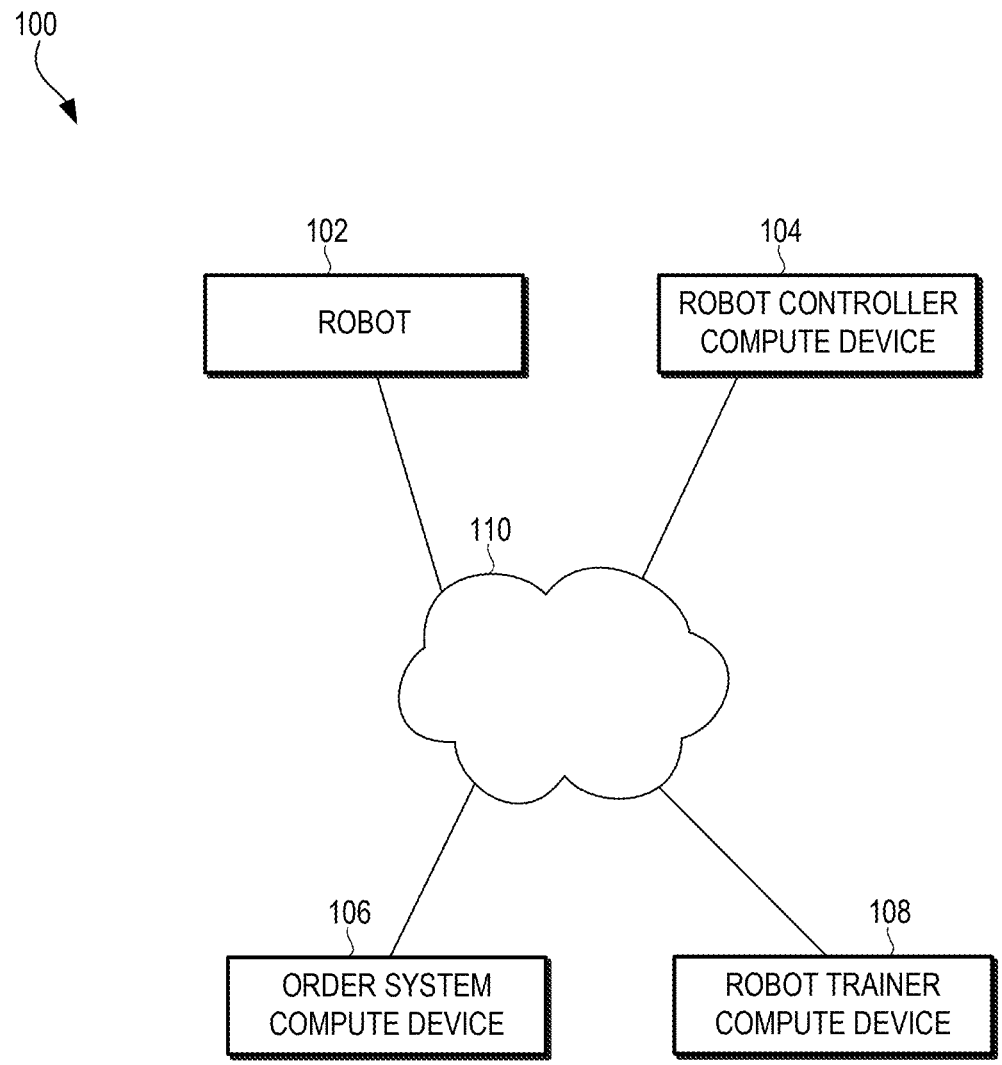
FIG. 1 is a simplified block diagram of a system for warehouse picking with a robot.

In an illustrative embodiment, a robot can partially or fully autonomously perform object picking in a warehouse. An order received from a customer can indicate an object to be picked. A description of the object including, e.g., where it is located in the warehouse, a size, a color, a weight, a barcode, etc., can be sent to a compute device controlling the robot. The compute device can direct the robot to move to where the object is located in the warehouse. The robot can then take a picture that can be analyzed. A text description as well as the image is encoded and provided to a perceiver transformer. The perceiver transformer generates an output latent vector indicating, e.g., where an end effector should grab hold of an object or a box. A goal generator can then determine a pose for the end effector based on the output latent vector. A planner can move the end effector to the determined pose. A new picture can be taken, and the cycle can repeat until the item is picked.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, system 100 for picking objects in a warehouse includes a robot 102, a robot controller compute device 104, an order system compute device 106, a robot trainer compute device 108. The robot 102 and various compute devices 104, 106, 108 are connected by a network 110. The network 110 may be embodied as a local network, the Internet, a cellular network, and/or the like.

In use, the order system compute device 106 determines an order to be fulfilled, such as an order placed by a customer on a website or an order entered by a human worker working in or associated with the warehouse. Order information is passed to the robot controller compute device 104. The robot controller compute device 104 directs the robot 102 to move to the location in the warehouse corresponding to the object and pick the object. To do so, the robot controller compute device 104 may use a variety of machine-learning-based tools, as described in more detail below. After the robot 102 has picked the object, the robot controller compute device 104 directs the robot 102 to deliver the object to a destination inside the warehouse. The robot 102 is then ready to pick another object.

Figure 2:
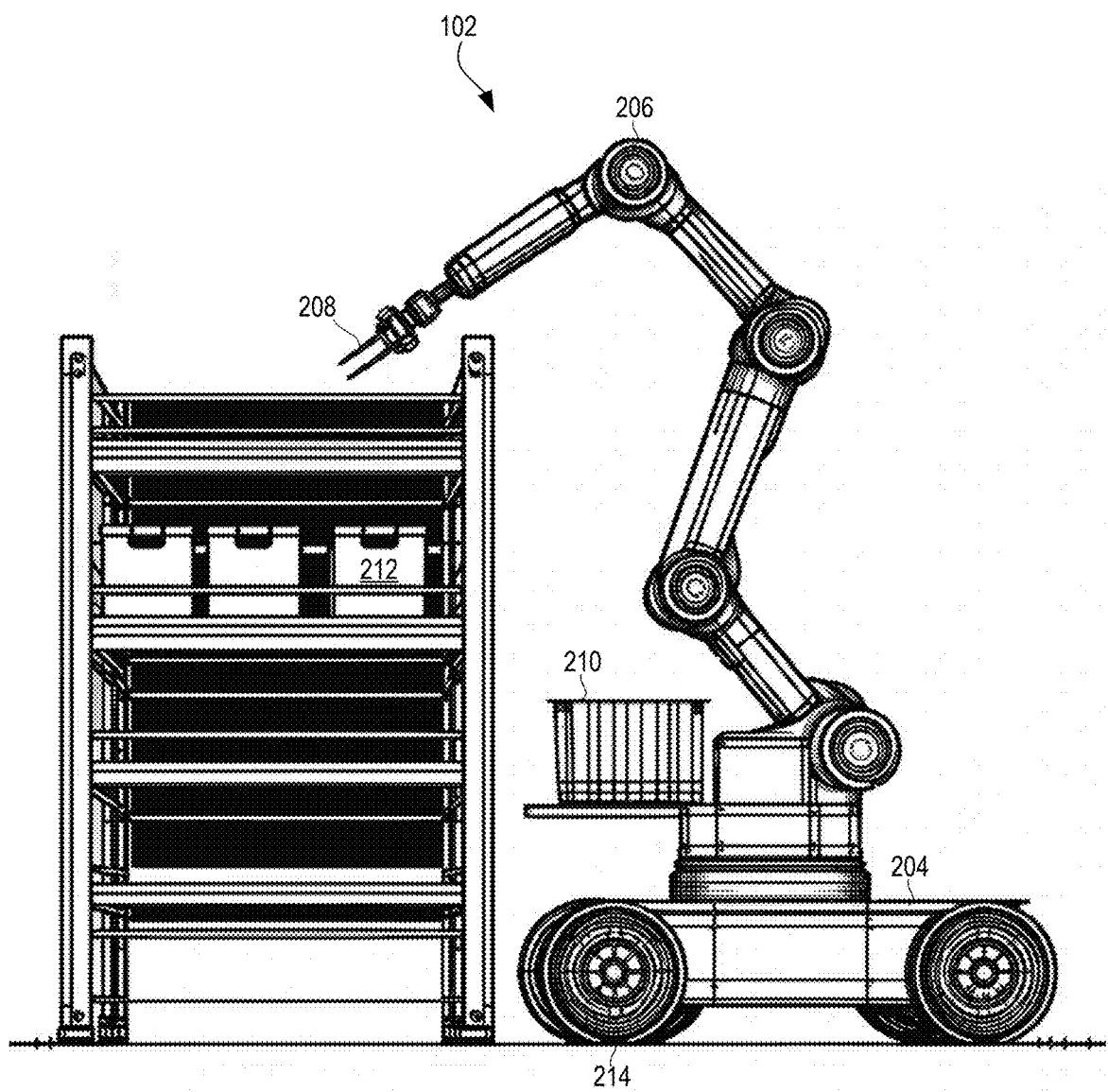
FIG. 2 is a simplified drawing of at least one embodiment of a robot in a warehouse environment.

Referring now to FIG. 2, in one embodiment, a depiction of the robot 102 in a warehouse environment is shown. The robot 102 includes a base 204 and an actuator arm 206 extending from the base 204. At one end of the actuator arm 206 is an end effector 208. In an illustrative embodiment, the end effector 208 can be positioned in three dimensions and oriented in three dimensions. The end effector 208 may include, e.g., a gripper, a contact sensor, or any other suitable end effector. In an illustrative embodiment, the end effector 208 can grasp objects. In use, the end effector 208 can grasp objects, such as the box 212 or an object in the box 212, and place it in a receptacle 210. The receptacle may be attached to the base 204 or other part of the robot 102. The robot 102 may have wheels 214, treads, or other mechanism to allow the robot to move around the warehouse.

Figure 3:
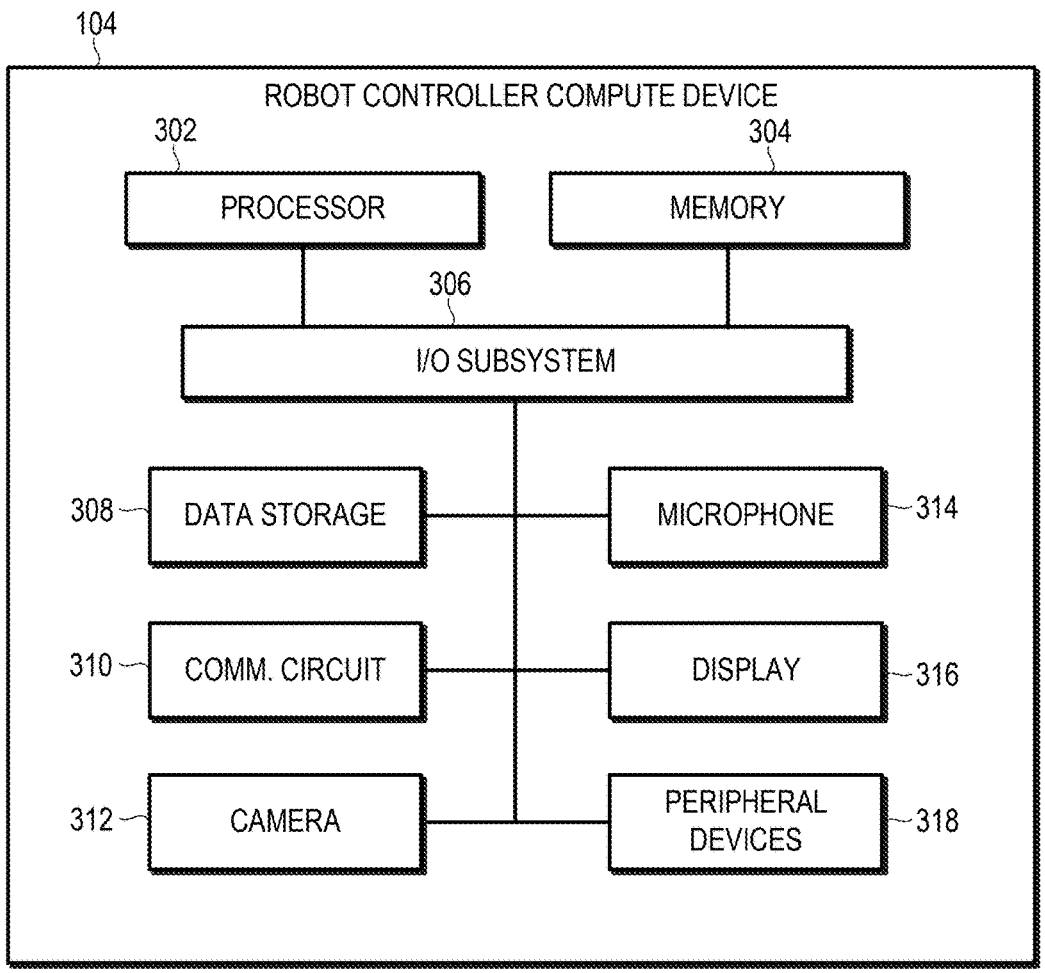
FIG. 3 is a simplified drawing of at least one embodiment of a compute device for controlling the robot in FIG. 2.

Referring now to FIG. 3, in one embodiment, a simplified diagram of the robot controller compute device 104 is shown. The robot controller compute device 104 may be embodied as any type of compute device. For example, the robot controller compute device 104 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other compute device. In some embodiments, the compute device 104 may be located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that hosts companies' applications and data), and an edge data center (e.g., a data center, typically having a smaller footprint than other data center types, located close to the geographic area that it serves). In some embodiments, some or all of the functionality of the robot controller compute device 104 described herein may be performed on a cloud platform, distributed platform, etc., made up of several physically distinct components, such as different processor 302 and memory 304 in different racks of a data center or multiple data centers. It should be appreciated that the term robot controller compute device 104 and other compute devices includes references to such physically distributed computing systems. In some embodiments, some or all of the components of the robot controller compute device 104 may be incorporated into the robot 102.

The illustrative robot controller compute device 104 includes a processor 302, a memory 304, an input/output (I/O) subsystem 306, data storage 308, a communication circuit 310, a camera 312, a microphone 314, a display 316, and one or more peripheral devices 318. In some embodiments, one or more of the illustrative components of the robot controller compute device 104 may be incorporated in, or otherwise form a portion of, another component. For example, the memory 304, or portions thereof, may be incorporated in the processor 302 in some embodiments. In some embodiments, one or more of the illustrative components may be physically separated from another component.

The processor 302 may be embodied as any type of processor capable of performing the functions described herein. For example, the processor 302 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 304 may be embodied as any type of volatile or non-volatile memory or data storage capable of performing the functions described herein. In operation, the memory 304 may store various data and software used during operation of the robot controller compute device 104, such as operating systems, applications, programs, libraries, and drivers. The memory 304 is communicatively coupled to the processor 302 via the I/O subsystem 306, which may be embodied as circuitry and/or components to facilitate input/output operations with the processor 302, the memory 304, and other components of the robot controller compute device 104. For example, the I/O subsystem 306 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 306 may connect various internal and external components of the robot controller compute device 104 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 306 may form a portion of a system-on-a-chip (SoC) and be incorporated, along with the processor 302, the memory 304, and other components of the robot controller compute device 104 on a single integrated circuit chip.

The data storage 308 may be embodied as any type of device or devices configured for the short-term or long-term storage of data. For example, the data storage 308 may include any one or more memory devices and circuits, memory cards, hard disk drives, solid-state drives, or other data storage devices.

The communication circuit 310 may be embodied as any type of interface capable of interfacing the robot controller compute device 104 with other compute devices, such as over one or more wired or wireless connections. In some embodiments, the communication circuit 310 may be capable of interfacing with any appropriate cable type, such as an electrical cable or an optical cable. The communication circuit 310 may be configured to use any one or more communication technology and associated protocols (e.g., Ethernet, Bluetooth®, Wi-Fi®, WiMAX, near field communication (NFC), etc.). The communication circuit 310 may be located on silicon separate from the processor 302, or the communication circuit 310 may be included in a multi-chip package with the processor 302, or even on the same die as the processor 302. The communication circuit 310 may be embodied as one or more add-in-boards, daughtercards, network interface cards, controller chips, chipsets, specialized components such as a field-programmable gate array (FPGA) or application-specific integrated circuit (ASIC), or other devices that may be used by the compute device 104 to connect with another compute device. In some embodiments, communication circuit 310 may be embodied as part of a system-on-a-chip (SoC) that includes one or more processors or included on a multichip package that also contains one or more processors. In some embodiments, the communication circuit 310 may include a local processor (not shown) and/or a local memory (not shown) that are both local to the communication circuit 310. In such embodiments, the local processor of the communication circuit 310 may be capable of performing one or more of the functions of the processor 302 described herein. Additionally or alternatively, in such embodiments, the local memory of the communication circuit 310 may be integrated into one or more components of the compute device 104 at the board level, socket level, chip level, and/or other levels.

The camera 312 may be any suitable camera that can capture image or video. The camera 312 may include one or more fixed or adjustable lenses and one or more image sensors. The image sensors may be any suitable type of image sensors, such as a CMOS or CCD image sensor. The image sensors can detect color (e.g., RBG) images and/or black-and-white images. The camera 312 may have any suitable aperture, focal length, field of view, etc. For example, the camera 312 may have a field of view of 60-110° in the azimuthal and/or elevation directions. In an illustrative embodiment, the camera 312 can capture distance data as well as image data, which can be used to determine the three-dimensional position of objects in the field of view of the camera 312.

The microphone 314 is configured to sense sound waves and output an electrical signal indicative of the sound waves. In the illustrative embodiment, the robot controller compute device 104 may have more than one microphone 314, such as an array of microphones 314 in different positions.

The display 316 may be embodied as any type of display on which information may be displayed to a user of the robot controller compute device 104, such as a touchscreen display, a liquid crystal display (LCD), a thin film transistor LCD (TFT-LCD), a light-emitting diode (LED) display, an organic light-emitting diode (OLED) display, a cathode ray tube (CRT) display, a plasma display, an image projector (e.g., 2D or 3D), a laser projector, a heads-up display, and/or other display technology. The display 316 may have any suitable resolution, such as 7680×4320, 3840×2160, 1920× 1200, 1920×1080, etc.

In some embodiments, the robot controller compute device 104 may include other or additional components, such as those commonly found in a compute device. For example, the robot controller compute device 104 may also have peripheral devices 318, such as a keyboard, a mouse, a speaker, an external storage device, a battery, etc. In some embodiments, the robot controller compute device 104 may be connected to a dock that can interface with various devices, including peripheral devices 318.

The order system compute device 106 and the robot trainer compute device 108 may have similar and/or the same hardware as the compute device 102. A description of that hardware will not be repeated in the interest of clarity. Of course, the particular hardware a device has may depend on the particular embodiment. For example, an order system compute device 106 may not include a camera 312 or microphone 314.

In an illustrative embodiment, the robot controller compute device 104, the order system compute device 106, and the robot trainer compute device 108 may all be physically separate compute devices. Additionally or alternatively, in some embodiments, the robot controller compute device 104, the order system compute device 106, the robot trainer compute device 108, and/or parts thereof may be combined in any suitable manner or made up of any suitable set of hardware components. For example, in one embodiment, some or all of the functionality of the robot controller compute device 104, the order system compute device 106, and/or the robot trainer compute device 108 may be implemented on an array of cloud compute devices or distributed compute devices, without a clear delineation of which hardware corresponds to which compute device 104, 106, 108. It should be appreciated that, in general, any suitable combination of hardware may be used to implement the functionality described herein. Of course, some hardware, such as the camera 312 and microphone 314, may need to be in a particular location, such as mounted on the robot 102 or distributed throughout the warehouse. In some embodiments, some of the compute devices 104, 106, 108 may implement some or all of the functionality of the other compute devices 104, 106, 108. For example, in one embodiment, the robot controller compute device 104 may implement some or all of the functionality of the order system compute device 106 and/or the robot trainer compute device 108.

Figure 4:
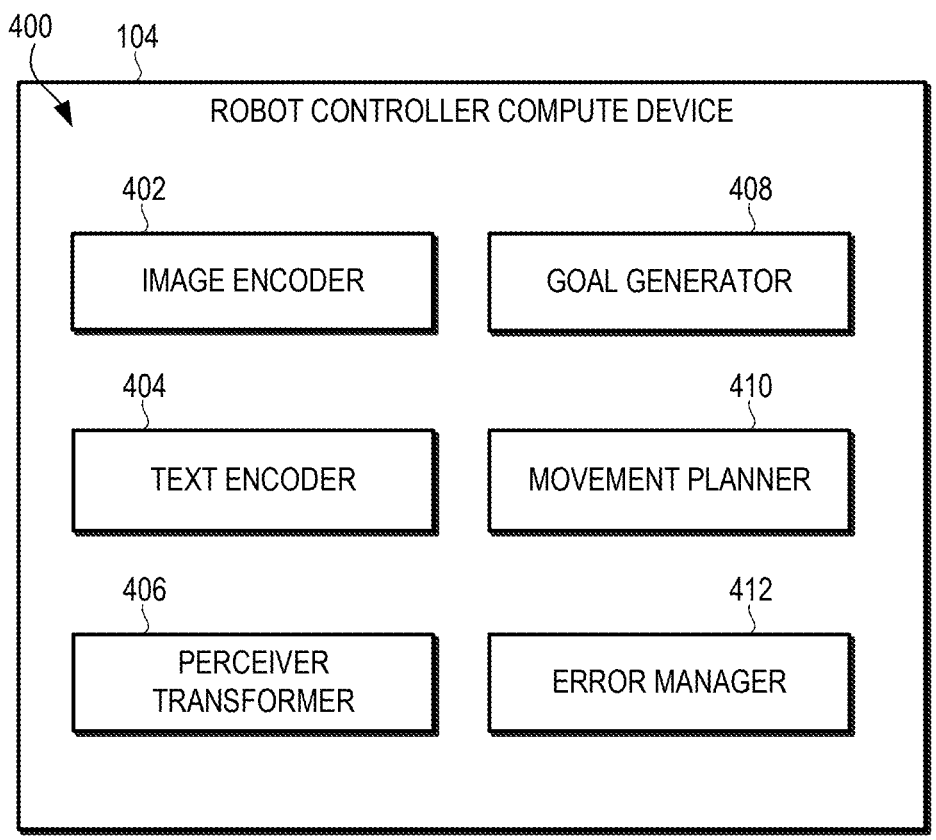
FIG. 4 is a simplified block diagram of at least one embodiment of an environment that may be established by the compute device of FIG. 2.

Referring now to FIG. 4, in an illustrative embodiment, the robot controller compute device 104 establishes an environment 400 during operation. The illustrative environment 400 includes an image encoder 402, a text encoder 404, a perceiver transformer 406, a goal generator 408, a movement planner 410, and an error manager 412. The various modules of the environment 400 may be embodied as hardware, software, firmware, or a combination thereof. For example, the various modules, logic, and other components of the environment 400 may form a portion of, or otherwise be established by, the processor 302, the memory 304, the data storage 308, or other hardware components of the robot controller compute device 104. As such, in some embodiments, one or more of the modules of the environment 400 may be embodied as circuitry or collection of electrical devices (e.g., image encoder circuitry 402, text encoder circuitry 404, perceiver transformer circuitry 406, etc.). It should be appreciated that, in such embodiments, one or more of the circuits (e.g., the image encoder circuitry 402, the text encoder circuitry 404, the perceiver transformer circuitry 406, etc.) may form a portion of one or more of the processor 302, the memory 304, the I/O subsystem 306, the data storage 308, and/or other components of the robot controller compute device 104. For example, in some embodiments, some or all of the modules may be embodied as the processor 302 as well as the memory 304 and/or data storage 308 storing instructions to be executed by the processor 302. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the processor 302 or other components of the robot controller compute device 104. It should be appreciated that some of the functionality of one or more of the modules of the environment 400 may require a hardware implementation, in which case embodiments of modules that implement such functionality will be embodied at least partially as hardware.

The image encoder 402, which may be embodied as hardware, firmware, software, virtualized hardware, emulated architecture, and/or a combination thereof, as discussed above, is configured to capture and process images. The image encoder 402 may capture images using the camera 312 or any other suitable camera. The image encoder 402 may capture an image of a rack, of a shelf, of an aisle, of one or more objects, etc. In an illustrative embodiment, the captured image is a color (e.g., RGB) image with depth information.

The image encoder 402 processes the image for any text, bar codes, etc. that are included in the image. For example, the image encoder 402 may perform natural language processing on any objects (including, potentially, the target object), packaging, labels for the rack, etc. Similarly, the image encoder 402 may scan for bar codes, QR codes, etc., on any objects (including, potentially, the target object), the rack, a shelf, etc. The image encoder 402 may look up information related to any bar code, QR code, or text. The image encoder 402 may pass any text-based information extracted from the image to the text encoder 404.

The image encoder 402 is configured to encode the image to generate an image feature vector. The image encoder 402 may use a neural network to perform the encoding. As part of encoding the image, objects may be detected and identified in the image, including object position, size, orientation, etc. All of the objects, including clutter in the area, may be detected. The image feature vector may indicate the location, size, orientation, number, etc., of objects in the image.

The text encoder 404, which may be embodied as hardware, firmware, software, virtualized hardware, emulated architecture, and/or a combination thereof, as discussed above, is configured to determine and encode a pick specification. The pick specification can include a variety of information about the object and related task information. For example, the pick specification may include sub-instructions, such as to pick up a box from a shelf, place the box on the floor, pick an object from the box and place it in the receptacle 210, and place the box back on the shelf. The pick instructions may be updated throughout the course of the task, such as when new information is received from the camera, from an inventory system, from a voice command from a nearby human worker, etc.

The pick specification may be determined based on a variety of information sources. For example, the text encoder 404 may determine or receive a pick manifest, such as from the order system compute device 106. The pick manifest may include, e.g., a color of the object, a size of the object, a location of the object in the warehouse, a pallet the object may be located at, a rack the object may be located at, a location of a shelf within a rack, dimensions of the rack and/or shelf the object is located at, a shape of the object, packaging of the object (such as whether the objects are placed within a box or sitting out on the shelf), a bar code of the object, a QR code of the object, a weight of the object, number of items needed, any special handling instructions (such as fragility, required orientation, whether it is a liquid, etc.). The pick manifest may include any other information needed to perform the picking. For example, in one embodiment, an older batch of a product may have one color, and a new batch of a product may have a new color. Both colors and expiration information may be provided in the pick manifest.

The text encoder 404 may also analyze information corresponding to the storage space for the object. For example, a bar code or similar labeling may be attached to the rack, and the bar code may be used to determine, e.g., dimensions (including width, depth, and height) of the storage space. The text encoder 404 may further analyze information from other agents. For example, in cooperative scenarios, one agent (human or robot) may help declutter a shelf while another agent performs the actual pick.

In an illustrative embodiment, the text encoder 404 generates the pick specification in a format that follows a particular template, such as YAML or JSON. In an illustrative embodiment, the text encoder 404 may use a large language model to convert the various information into a format that corresponds to the template. The large language model may be fine-tuned to understand robotics and warehouse semantics to be able to transform queries from multiple sources into a specific text template. The pick specification may be stored in the format of the text template and may be readable and editable by different agents.

The text encoder 404 is configured to encode the pick specification to generate a linguistic feature vector corresponding to the pick specification. The text encoder 404 may use a neural network to encode the pick specification.

The perceiver transformer 406, which may be embodied as hardware, firmware, software, virtualized hardware, emulated architecture, and/or a combination thereof, as discussed above, is configured to receive the image feature vector from the image encoder 402 and the linguistic feature vector from the text encoder 404. The perceiver transformer 406 is a pre-trained perceiver transformer. The perceiver transformer 406 is configured to generate a latent vector output. The perceiver transformer 406 uses a small set of latent vectors to process extremely long input sequences. The output of the perceiver transformer has the same dimensions as the input latent array. In an illustrative embodiment, the output is encoded into a latent variable applying the SoftFlow technique. In an illustrative embodiment, the perceiver transformer 406 is agnostic to the particular robot 102 that will be used, which can avoid the need for high-precision voxelization. Rather, the perceiver transformer 406 has learned to encode the geometry of the objects in the field of view of the camera as well as the likelihood that different parts of each object will be selected as the next object to be manipulated.

The goal generator 408, which may be embodied as hardware, firmware, software, virtualized hardware, emulated architecture, and/or a combination thereof, as discussed above, is configured to receive a latent vector output from the perceiver transformer 406 and generate a goal. In an illustrative embodiment, the goal generator 408 implements a neural network that takes in as an input the latent vector output from the perceiver transformer 406 and generates a target pose for the end effector 208. The goal generator 408 may be a continuous normalized flow (CNF) network that learns data-driven poses for the end effector 208 for the robot 102, conditioned to be valid next actions on picking tasks. The CNF network is trained to learn the configuration distribution for a particular type of robot for a given latent feature vector. The configurations sampled from the learned distribution can be converted into target poses for the end effector 208 using the direct kinematics of the robot 102.

The movement planner 410, which may be embodied as hardware, firmware, software, virtualized hardware, emulated architecture, and/or a combination thereof, as discussed above, is configured to receive a target end effector pose from the goal generator 408. The planner 410 determines how to reach the target pose for the end effector 208 without colliding with anything. The planner 410 may use any suitable collision-avoidance motion planner, such as a stochastic motion planner.

The error manager 412, which may be embodied as hardware, firmware, software, virtualized hardware, emulated architecture, and/or a combination thereof, as discussed above, is configured to check whether any error or interrupt condition has been met. An interrupt condition may be any variety of conditions, such as an updated picture from a camera showing that an object has moved since the target pose was determined, an update changing the pick manifest or pick specification, an instruction was received from another agent, an error has occurred (such as an object cannot be found, an unexpected collision occurred, etc.). The error manager 412 may manage an error in any suitable manner. Depending on the interrupt condition, the error manager 412 may manage the error interrupt condition by, e.g., capturing another image, determining a new pick specification, executing the perceiver transformer 406 and goal generator 408 again, etc. In some embodiments, such as in a HOPS scenario, a picking strategy (such as order picking, batch picking, or zone picking) will influence how the error manager 412 should handle potential error or interrupt conditions, such as not being able to locate or recognize the object or failing to grip the object. In some embodiments, the error manager 412 may notify an operator, administrator, human worker, etc., and wait for instructions to resolve the error.

Figure 5:
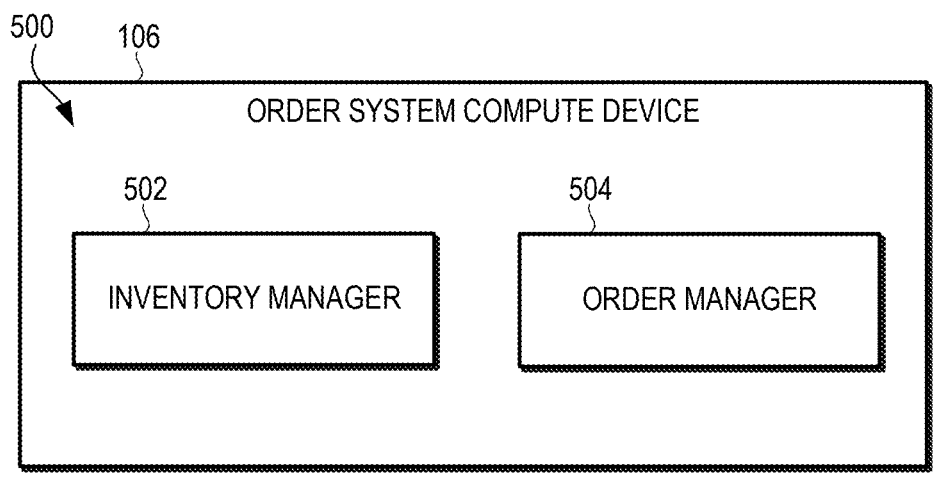
FIG. 5 is a simplified block diagram of at least one embodiment of an environment that may be established by the order system compute device of FIG. 1.

Referring now to FIG. 5, in an illustrative embodiment, the order system compute device 106 establishes an environment 500 during operation. The illustrative environment 500 includes inventory manager 502 and order manager 504. The various modules of the environment 500 may be embodied as hardware, software, firmware, or a combination thereof. For example, the various modules, logic, and other components of the environment 500 may form a portion of, or otherwise be established by, the processor, the memory, the data storage, or other hardware components of the order system compute device 106. As such, in some embodiments, one or more of the modules of the environment 500 may be embodied as circuitry or collection of electrical devices (e.g., inventory manager circuitry 502, order manager circuitry 504, etc.). It should be appreciated that, in such embodiments, one or more of the circuits (e.g., the inventory manager circuitry 502, the order manager circuitry 504, etc.) may form a portion of one or more of the processor, the memory, the I/O subsystem, the data storage, and/or other components of the order system compute device 106. For example, in some embodiments, some or all of the modules may be embodied as the processor as well as the memory and/or data storage storing instructions to be executed by the processor. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture, which may be established and maintained by the processor or other components of the order system compute device 106. It should be appreciated that some of the functionality of one or more of the modules of the environment 500 may require a hardware implementation, in which case embodiments of modules that implement such functionality will be embodied at least partially as hardware.

The inventory manager 502, which may be embodied as hardware, firmware, software, virtualized hardware, emulated architecture, and/or a combination thereof, as discussed above, is configured to manage inventory contained in the warehouse. The inventory manager 502 includes information about each item in the warehouse, such as location, a color of the object, a size of the object, a pallet the object may be located at, a rack the object may be located at, a location of a shelf within a rack, dimensions of the rack and/or shelf the object is located at, a shape of the object, packaging of the object (such as whether the objects are placed within a box or sitting out on the shelf), a bar code of the object, a QR code of the object, a weight of the object, any special handling instructions (such as fragility, required orientation, whether it is a liquid, etc.).

The order manager 504, which may be embodied as hardware, firmware, software, virtualized hardware, emulated architecture, and/or a combination thereof, as discussed above, is configured to receive and manage orders for items in the warehouse. The order manager 504 may receive orders customers, from a fulfillment center, from another source, such as a human worker working at or otherwise associated with the warehouse, etc. The order system compute device 106 may pass the order information to the robot controller compute device 104 to fulfill the order.

Figure 6:
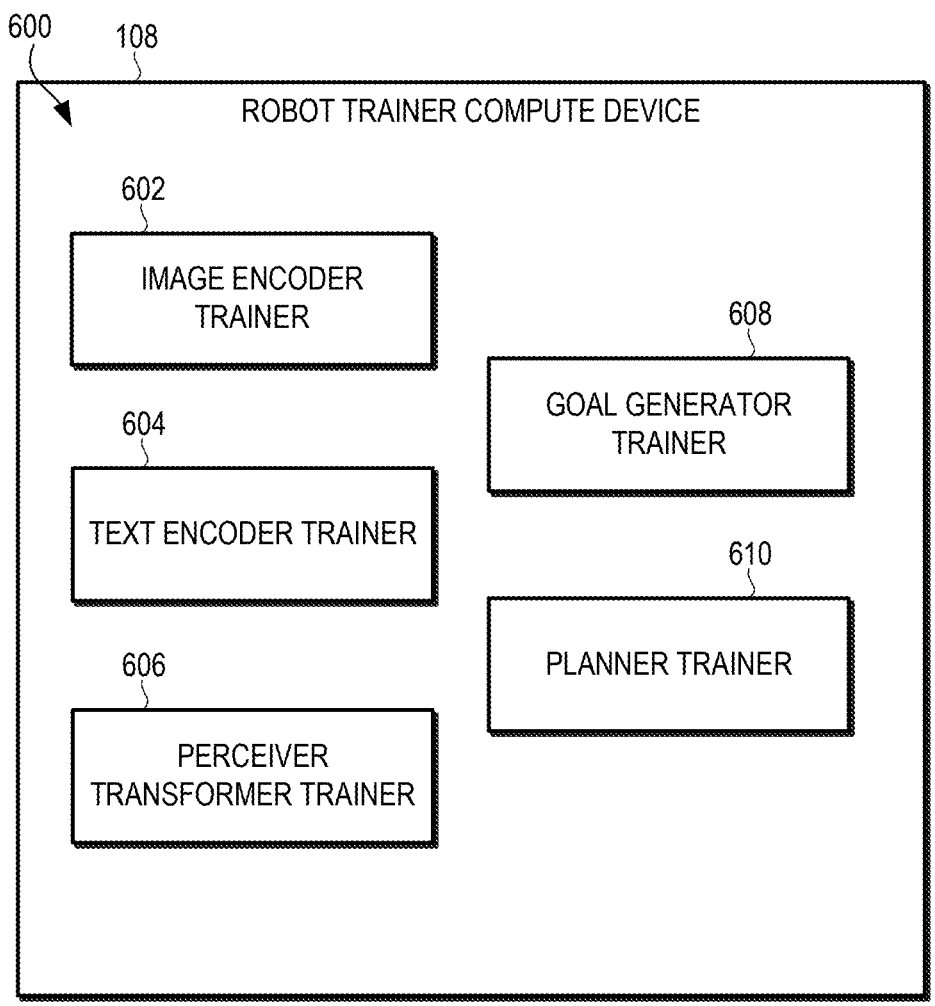
FIG. 6 is a simplified block diagram of at least one embodiment of an environment that may be established by the robot trainer compute device of FIG. 1.

Referring now to FIG. 6, in an illustrative embodiment, the robot trainer compute device 108 establishes an environment 600 during operation. The illustrative environment 600 includes image encoder trainer 602, text encoder trainer 604, perceiver transformer trainer 606, goal generator trainer 608, and planner trainer 610. The various modules of the environment 600 may be embodied as hardware, software, firmware, or a combination thereof. For example, the various modules, logic, and other components of the environment 600 may form a portion of, or otherwise be established by, the processor, the memory, the data storage, or other hardware components of the robot trainer compute device 108. As such, in some embodiments, one or more of the modules of the environment 600 may be embodied as circuitry or collection of electrical devices (e.g., image encoder trainer circuitry 602, text encoder trainer circuitry 604, perceiver transformer trainer circuitry 606, etc.). It should be appreciated that, in such embodiments, one or more of the circuits (e.g., the image encoder trainer circuitry 602, the text encoder trainer circuitry 604, the perceiver transformer trainer circuitry 606, etc.) may form a portion of one or more of the processor, the memory, the I/O subsystem, the data storage, and/or other components of the robot trainer compute device 108. For example, in some embodiments, some or all of the modules may be embodied as the processor as well as the memory and/or data storage storing instructions to be executed by the processor. Additionally, in some embodiments, one or more of the illustrative modules may form a portion of another module and/or one or more of the illustrative modules may be independent of one another. Further, in some embodiments, one or more of the modules of the environment 600 may be embodied as virtualized hardware components or emulated architecture, which may be established and maintained by the processor or other components of the robot trainer compute device 108. It should be appreciated that some of the functionality of one or more of the modules of the environment 600 may require a hardware implementation, in which case embodiments of modules that implement such functionality will be embodied at least partially as hardware.

The image encoder trainer 602, which may be embodied as hardware, firmware, software, virtualized hardware, emulated architecture, and/or a combination thereof, as discussed above, is configured to train the image encoder 402. To do so, the image encoder trainer 602 may generate a scenario in a virtual environment for the robot 102. image encoder trainer 602 may generate random scenarios in a physics simulator. The image encoder trainer 602 may generate a task, such as a task to pick an object on a particular shelf. Generating a task may include generating all of the information used by the various modules of the environment 400 described above, such as object size, position, color, etc. The image encoder trainer 602 may generate task variations including randomly sampled colors, sizes, shapes, counts, placements, and categories of objects. The image encoder trainer 602 generates one or more objects on the shelf or on nearby shelves, as well as the rest of the scene. The image encoder trainer 602 the image encoder 402 to generate an image feature vector based on a simulated image from a camera based on the generated scene.

The text encoder trainer 604, which may be embodied as hardware, firmware, software, virtualized hardware, emulated architecture, and/or a combination thereof, as discussed above, is configured to train the text encoder 404. To do so, for each variation of the task generated by the image encoder trainer 602, the text encoder trainer 604 may generate a list of textual descriptions that describe the objective, such as "pick the top bx" or "push the wine bottle to the left of the rack." A natural language processing (NLP) or large language model (LLM) that is fine-tuned to understand robotic semantics to transform user queries into such a template. The text encoder trainer 604 may train the text encoder 404 to encode language from the format of the pick specification corresponding to a template to a linguistic feature vector.

The perceiver transformer trainer 606, which may be embodied as hardware, firmware, software, virtualized hardware, emulated architecture, and/or a combination thereof, as discussed above, is configured to train the perceiver transformer 406 based on the linguistic feature vector and image feature vector. In an illustrative embodiment, the perceiver transformer is trained with the latent vector initialized with random values, and the perceiver transformer is trained end-to-end.

The goal generator trainer 608, which may be embodied as hardware, firmware, software, virtualized hardware, emulated architecture, and/or a combination thereof, as discussed above, is configured to train a goal generator 408 based on the output of the perceiver transformer 406. The illustrative goal generator 408 is a continuous normalizing flow network. The network is trained to learn the configuration distribution for a particular type of robot 102 for a given latent feature vector. The configurations sampled from the learned distribution can be converted into target end effector poses using the direct kinematics of the robot 102.

The planner trainer 610, which may be embodied as hardware, firmware, software, virtualized hardware, emulated architecture, and/or a combination thereof, as discussed above, is configured to train a movement planner 410 based on the goal generated by the goal generator 408. The planner 410 may be a stochastic collision-avoiding motion planner.

It should be appreciated that the image encoder trainer 602 may generate a large number of random scenarios, ensuring that the various components are capable of handling a wide variety of environments that the robot 102 may encounter. The various modules of the robot trainer compute device 108 may be trained many times on a wide variety of random tasks.

Figure 7:
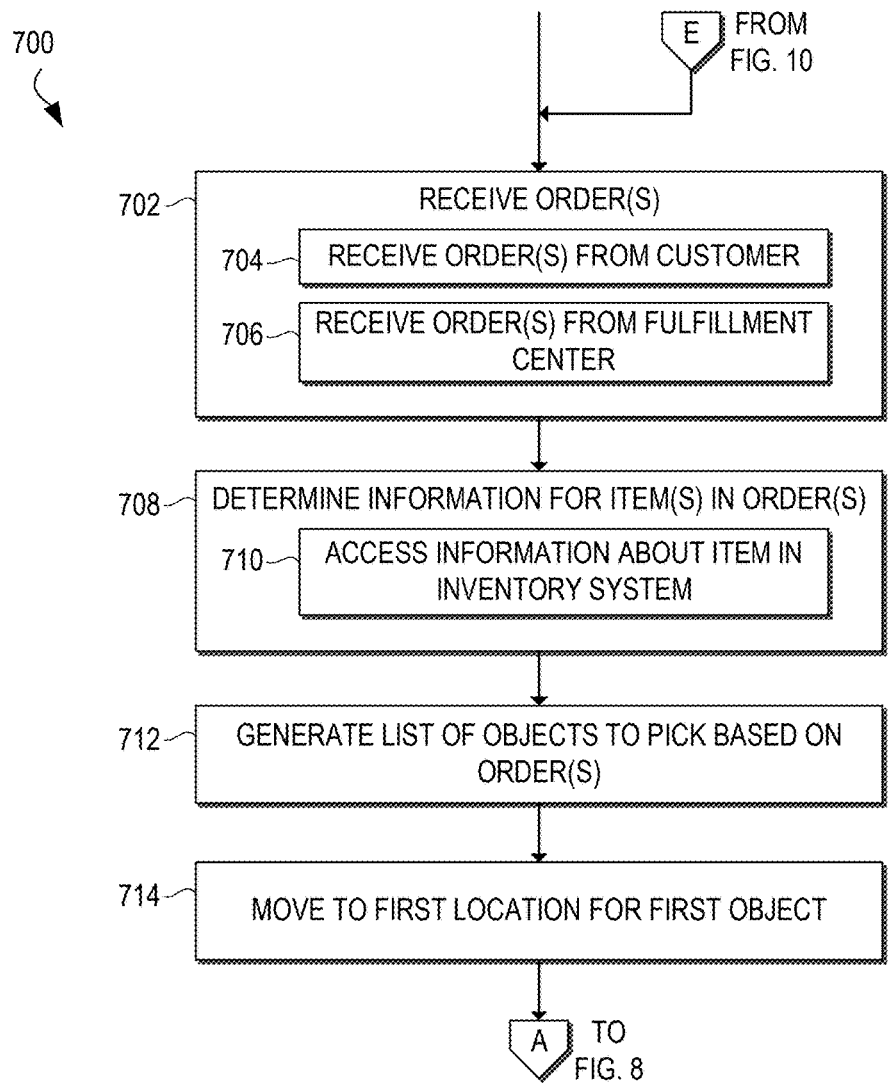
FIGS. 7-10 are a simplified flow diagram of at least one embodiment of a method for picking objects in a warehouse with a robot.

Referring now to FIG. 7, in use, the robot controller compute device 104 and/or the order system compute device 106 may execute a method 700 for controlling a robot to pick an object in a warehouse. It should be appreciated that, in some embodiments, various aspects of the method 700 may be performed by any suitable combination of compute devices 104, 106, 108.

The method 700 begins in block 702, in which the order system compute device 106 receives one or more orders. The order system compute device 106 may receive one or more orders from one or more customers in block 704. Additionally or alternatively, the order system compute device 106 may receive one or more orders from a fulfillment center in block 706. In other embodiments, the order system compute device 106 may receive orders from another source, such as a human worker working at or otherwise associated with the warehouse. The order system compute device 106 may pass the order information to the robot controller compute device 104 to fulfill the order.

In block 708, the robot controller compute device 104 determines information for one or more items in the one or more orders. The robot controller compute device 104 may determine information for several distinct orders. The robot controller compute device 104 may pick objects for several orders based on, e.g., how close the objects for different orders are in the warehouse, how much space there is in the receptacle 210, etc. The robot controller compute device 104 may access information about the items in the orders in an inventory system in block 710. For each object to be picked, the robot controller compute device 104 may determine, e.g., a color of the object, a size of the object, a location of the object in the warehouse, a pallet the object may be located at, a rack the object may be located at, a location of a shelf within a rack, dimensions of the rack and/or shelf the object is located at, a shape of the object, packaging of the object (such as whether the objects are placed within a box or sitting out on the shelf), a bar code of the object, a QR code of the object, a weight of the object, number of items needed, any special handling instructions (such as fragility, required orientation, whether it is a liquid, etc.). The information may include any other information needed to perform the picking. For example, in one embodiment, an older batch of a product may have one color, and a new batch of a product may have a new color. Both colors may be provided, and the robot controller compute device 104 may first search for an object with the color corresponding to the older batch and then search for an object with the color corresponding to the newer batch if nothing from the older batch can be found. The information about the object may be stored as a pick manifest.

In block 712, the robot controller compute device 104 generates a list of objects to pick based on the received orders and the items in the orders. For example, the robot controller compute device 104 might select a list of objects that are located in the same area of the warehouse. The robot controller compute device 104 may order the list in any suitable manner, such as to provide a short path length to pick all of the objects, to pick heavier objects first so they are on the bottom of the receptacle 210, etc.

In block 714, the robot controller compute device 104 instructs the robot 102 to move to a first location corresponding to the first object.

Figure 8:
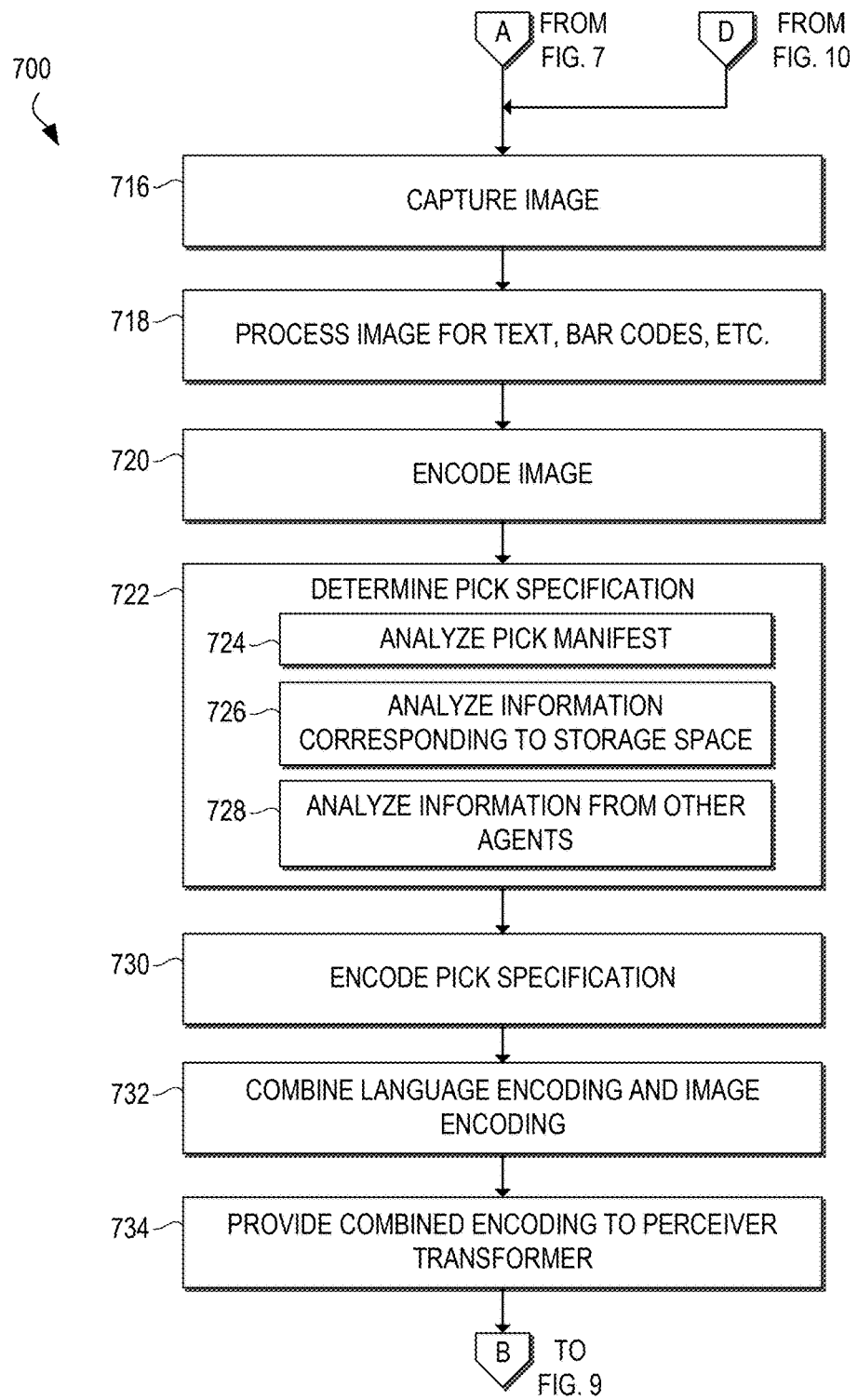

Referring now to FIG. 8, in block 716, the robot controller compute device 104 captures an image. The robot controller compute device 104 may capture an image of a rack, of a shelf, of an aisle, of one or more objects, etc. The robot controller compute device 104 may capture in image using the camera 312 or any other suitable camera. In an illustrative embodiment, the captured image is a color (e.g., RGB) image with depth information.

In block 718, the robot controller compute device 104 processes the image for any text, bar codes, etc. that are included in the image. For example, the robot controller compute device 104 may perform natural language processing on any objects (including, potentially, the target object), packaging, labels for the rack, etc. Similarly, the robot controller compute device 104 may scan for bar codes, QR codes, etc., on any objects (including, potentially, the target object), the rack, a shelf, etc. The robot controller compute device 104 may look up information related to any bar code, QR code, or text.

In block 720, the robot controller compute device 104 encodes the image to generate an image feature vector. The robot controller compute device 104 may use a neural network to perform the encoding. As part of encoding the image, objects may be detected and identified in the image, including object position, size, orientation, etc. All of the objects, including clutter in the area, may be detected. The image feature vector may indicate the location, size, orientation, number, etc. of objects in the image.

In block 722, the robot controller compute device 104 determines a pick specification. The pick specification can include a variety of information about the object and related task information. For example, the pick specification may include sub-instructions, such as to pick up a box from a shelf, place the box on the floor, pick an object from the box and place it in the receptacle 210, and place the box back on the shelf. The pick instructions may be updated throughout the course of the task, such as when new information is received from the camera, from an inventory system, from a voice command from a nearby human worker, etc.

The pick specification may be determined based on a variety of information sources. For example, in block 724, the pick manifest is analyzed. As described above, the pick manifest may include the object shape, color, expected position, weight, etc. In block 726, information corresponding to the storage space for the object is analyzed. For example, a bar code or similar labeling may be attached to the rack, and the bar code may be used to determine, e.g., dimensions (including width, depth, and height) of the storage space. In block 728, information from other agents may be analyzed. For example, in cooperative scenarios, one agent (human or robot) may help declutter a shelf while another agent performs the actual pick.

In an illustrative embodiment, the pick specification may be generated in a format that follows a particular template, such as YAML or JSON. In an illustrative embodiment, the robot controller compute device 104 may use a large language model to convert the various information into a format that corresponds to the template. The large language model may be fine-tuned to understand robotics and warehouse semantics to be able to transform queries from multiple sources into a specific text template. The pick specification may be stored in the format of the text template and may be readable and editable by different agents.

In block 730, the robot controller compute device 104 encodes the pick specification to generate a linguistic feature vector corresponding to the pick specification. The robot controller compute device 104 may use a neural network to encode the pick specification.

In block 732, the robot controller compute device 104 combines the image feature vector and the linguistic feature vector, such as by concatenating them. In some embodiments, information from other sensors or state information about the robot 102 may be included in the vector, such as a state of the end effector 208, state of a contact, state of the robot arm 206, etc.

In block 734, the combined encoding is provided to a pre-trained perceiver transformer, such as the perceiver transformer 406 described above.

Figure 9:
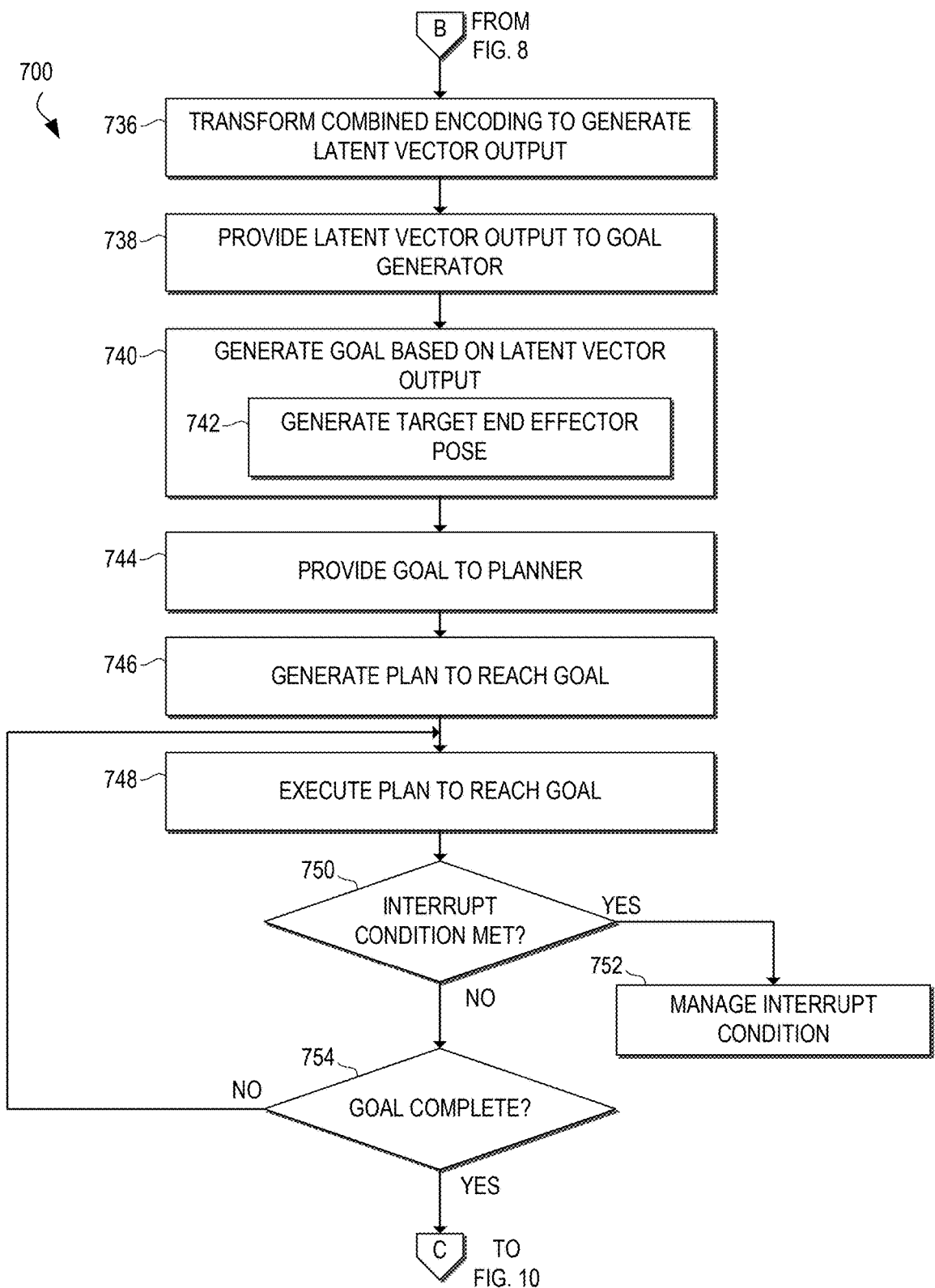

Referring now to FIG. 9, in block 736, the robot controller compute device 104 uses the perceiver transformer to generate a latent vector output. The perceiver transformer uses a small set of latent vectors to process extremely long input sequences. The output of the perceiver transformer has the same dimensions as the input latent array. In an illustrative embodiment, the output is encoded into a latent variable applying the SoftFlow technique. In an illustrative embodiment, the perceiver transformer is agnostic to the particular robot 102 that will be used, which can avoid the need for high-precision voxelization. Rather, the perceiver transformer has learned to encode the geometry of the objects in the field of view of the camera as well as the likelihood that different parts of each object will be selected as the next object to be manipulated.

In block 738, the robot controller compute device 104 provides the latent vector output to a goal generator, such as the goal generator 408. As described above, in an illustrative embodiment, the goal generator is a neural network that takes in as an input the latent vector output from the perceiver transformer and generates a target pose for the end effector 208. The goal generator may be a continuous normalized flow (CNF) network that learns data-driven poses for the end effector 208 for the robot 102, conditioned to be valid next actions on picking tasks. The CNF network is trained to learn the configuration distribution for a particular type of robot for a given latent feature vector. The configurations sampled from the learned distribution can be converted into target poses for the end effector 108 using the direct kinematics of the robot 102.

In block 740, the robot controller compute device 104 generates a goal based on the latent vector output. The goal may be embodied as a target position and orientation for the end effector 208 as well as a state of the end effector, such as closed or open. In an illustrative embodiment, the robot controller compute device 104 generates several grasp candidates based on the latent vector output and ranks the grasp candidates according to their likelihood to be selected as the next grasp. The most likely candidate may be selected as the goal in block 742.

In block 744, the robot controller compute device 104 provides the target end effector pose to a planner, such as the planner 410. The robot controller compute device 104 uses the planner to determine how to reach the target pose for the end effector 208 without colliding with anything in block 746. The robot controller compute device 104 may use any suitable collision-avoidance motion planner, such as a stochastic motion planner.

In block 748, the robot controller compute device 104 executes the plan to reach the goal of the target pose for the end effector 108. In block 750, while executing the plan, the robot controller compute device 104 checks whether an interrupt condition has been met. An interrupt condition may be any variety of conditions, such as an updated picture from a camera showing that an object has moved since the target pose was determined, an update changing the pick manifest or pick specification, an instruction was received from another agent, an error has occurred (such as an object cannot be found, an unexpected collision occurred, etc.). If an interrupt condition is met, the method 700 proceeds to block 752, in which the interrupt condition is managed. Depending on the interrupt condition, the interrupt condition may be handled in any suitable manner, such as by jumping to block 716 to capture another image, determine a new pick specification, etc. In some embodiments, such as in a HOPS scenario, a picking strategy (such as order picking, batch picking, or zone picking) will influence how the robot 102 should handle potential error or interrupt conditions, such as not being able to locate or recognize the object or failing to grip the object.

Referring back to block 750, if an interrupt condition is not met, the method 700 proceeds to block 754, in which the robot controller compute device 104 checks whether the goal is complete (e.g., whether the end effector 208 has reached the target pose). If it is not, the method 700 loops back to block 748 to continue executing the plan to reach the goal. If it is, the method 700 proceeds to block 756 in FIG. 10.

Figure 10:
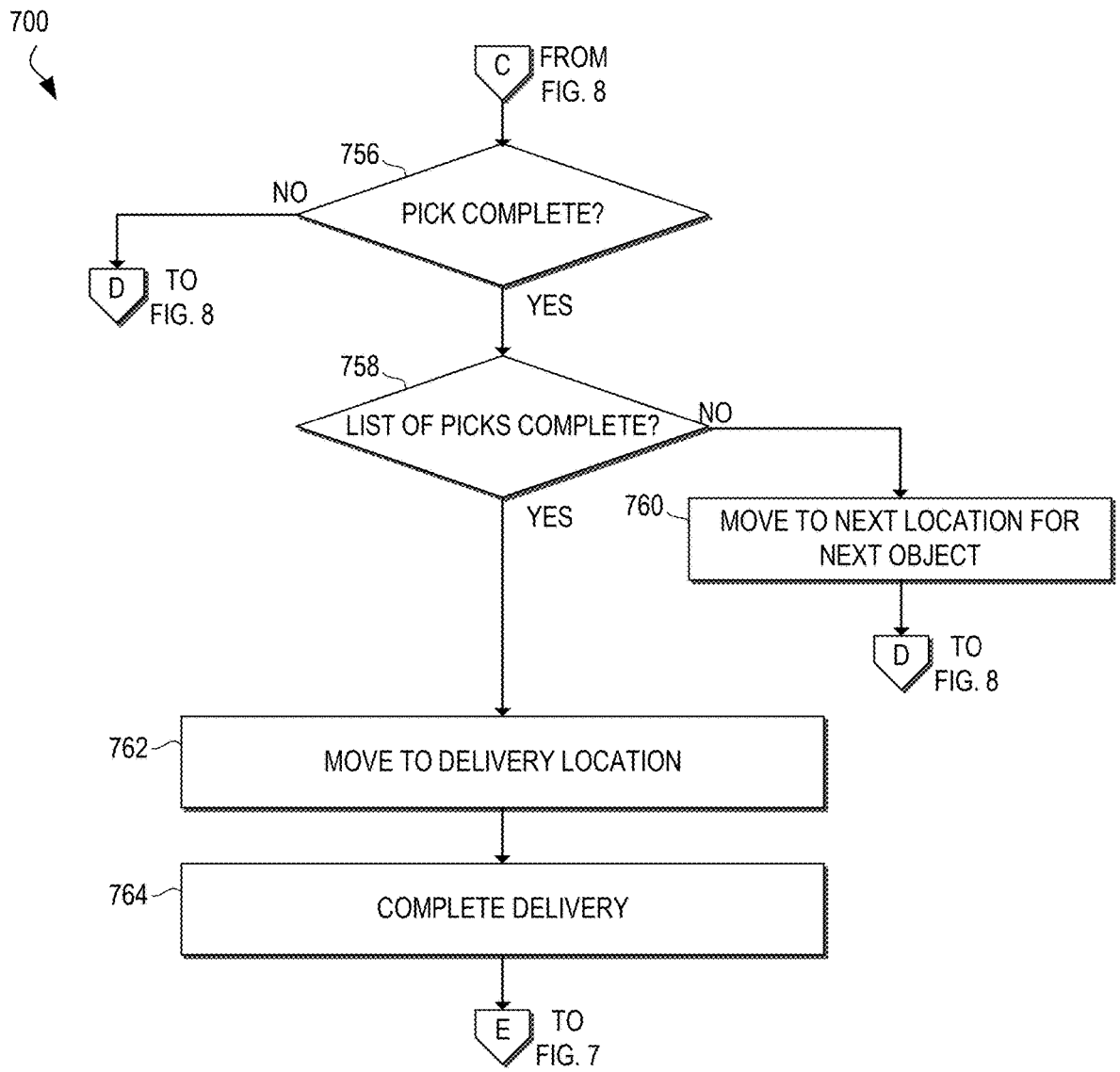

Referring now to FIG. 10, in block 756, the robot controller compute device 104 checks whether the pick is complete. For example, the robot controller compute device 104 may check whether the picked object is in the receptacle 210 and whether anything else removed from the shelf has been put back in place. The robot controller compute device 104 may proceed through several goals before the pick is complete, such as moving the end effector 208 close to a target object, move the end effector 208 to be touching the target object, grasp the target object, lift the target object up, move the target object to the receptacle 210, and release the target object. If the pick is not complete, the method 700 loops back to block 716 to capture another image, determine another pick specification, generate another goal, etc. It should be appreciated that looping back to block 716 allows for a closed-loop approach, generating a new pick specification, latent vector, target pose goal, etc., as new information is received, such as information from the order system compute device 106, a change in the scene that can be captured by the camera 312, a change in sensor information from the robot 102, etc. The process of generating a goal and planning a movement can be done at a rate of hundreds of times per second. The process of operating the perceiver transformer can be performed several times per second (e.g., 1-30 times per second), allowing for real-time closed-loop operation.

If the pick is complete, the method 700 proceeds to block 758, in which the robot controller compute device 104 checks whether the list of picks generated in block 712 is complete. If it is not, the method 700 proceeds to block 760, in which the robot controller compute device 104 moves the robot 102 to the next location corresponding to the next object in the list of picks. If the list of picks is completed, the method 700 proceeds to block 762, in which the robot controller compute device 104 controls the robot 102 to move to a delivery location, such as a shipping desk at the warehouse. In block 764, the robot controller compute device 104 completes the delivery, such as by using the robot to move objects from the receptacle 210 to another surface or by waiting while another agent (robot or human) removes the objects from the receptacle 210. The method 700 then loops back to block 702 to receive more orders.

Figure 11:
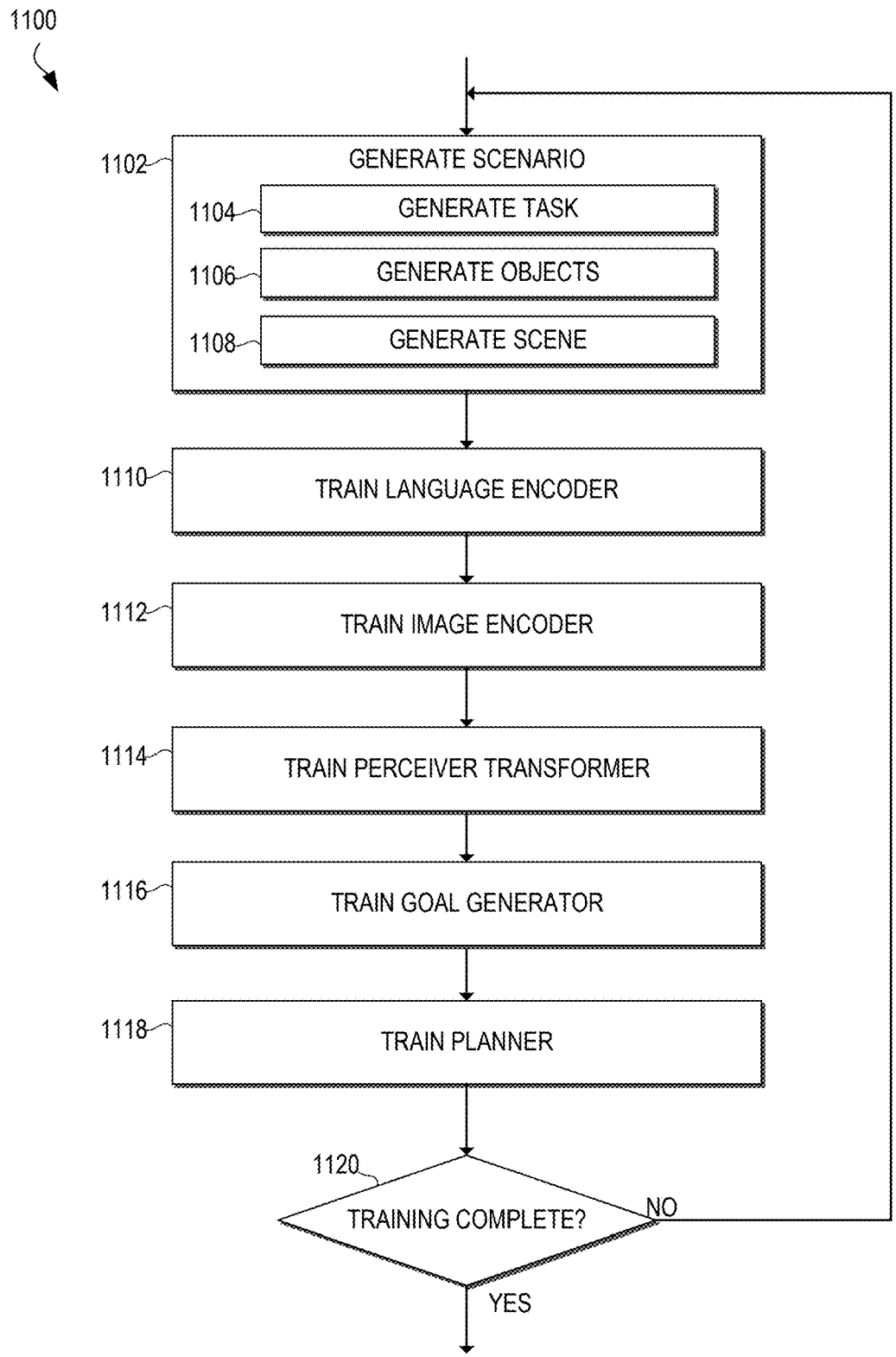
FIG. 11 is a simplified flow diagram of at least one embodiment of a method for training a robot to pick object in a warehouse.

Referring now to FIG. 11, in use, the robot trainer compute device 108 may execute a method 1100 for training the various components of the robot controller compute device 104 to control a robot 102 to pick objects in a warehouse. It should be appreciated that, in some embodiments, various aspects of the method 1100 may be performed by any suitable combination of compute devices 104, 106, 108.

The method 1100 begins in block 1102, in which the robot trainer compute device 108 generates a scenario in a virtual environment for the robot 102. The robot trainer compute device 108 may generate random scenarios in a physics simulator. In block 1104, the robot trainer compute device 108 generates a task, such as a task to pick an object on a particular shelf. Generating a task may include generating all of the information used in the method 700 described above, such as object size, position, color, etc. The robot trainer compute device 108 may generate task variations including randomly sampled colors, sizes, shapes, counts, placements, and categories of objects. For each variation, the robot trainer compute device 108 may generate a list of textual descriptions that describe the objective, such as "pick the top bx" or "push the wine bottle to the left of the rack." A natural language processing (NLP) or large language model (LLM) that is fine-tuned to understand robotic semantics to transform user queries into such a template.

In block 1106, the robot trainer compute device 108 generates one or more objects on the shelf or on nearby shelves. In block 1108, the robot trainer compute device 108 generates the rest of the scene.

In block 1110, the robot trainer compute device 108 trains a language encoder to encode language from the format of the pick specification corresponding to a template to a linguistic feature vector. In block 1112, the robot trainer compute device 108 trains an image encoder to generate an image feature vector based on a simulated image from a camera based on the generated scene.

In block 1114, the robot trainer compute device 108 trains a perceiver transformer based on the linguistic feature vector and image feature vector. In an illustrative embodiment, the perceiver transformer is trained with the latent vector initialized with random value, and the perceiver transformer is trained end-to-end.

In block 1116, the robot trainer compute device 108 trains a goal generator based on the output of the perceiver transformer. The illustrative goal generator is a continuous normalizing flow network. The network is trained to learn the configuration distribution for a particular type of robot 102 for a given latent feature vector. The configurations sampled from the learned distribution can be converted into target end effector poses using the direct kinematics of the robot 102.

In block 1118, the robot trainer compute device 108 trains a planner based on the goal generated by the goal generator. The planner may be a stochastic collision-avoiding motion planner.

In block 1120, if the training is not complete, the method 1100 loops back to block 1102 to generate another scenario. The robot trainer compute device 108 may generate a large number of random scenarios, ensuring that the various components are capable of handling a wide variety of environments that the robot 102 may encounter. If the training is complete, the robot controller compute device 104 may be used to control the robot to perform picking of objects in the warehouse.

EXAMPLES

Illustrative examples of the technologies disclosed herein are provided below. An embodiment of the technologies may include any one or more, and any combination of, the examples described below.

Example 1 includes a compute device comprising a processor; and data storage coupled to the processor, the data storage comprising thereon a plurality of instructions that, when executed, causes the processor to determine a pick specification, wherein the pick specification comprises information about an object to be picked by a robot; receive an image; encode the pick specification to generate an encoded pick specification; encode the image to generate an encoded image; provide the encoded pick specification and the encoded image to a transformer network to generate a transformer vector output; provide the transformer vector output to a goal generator network to generate a target pose for an end effector of the robot; and control the end effector of the robot based on the target pose.

Example 2 includes the subject matter of Example 1, and wherein the plurality of instructions further cause the processor to perform a plurality of closed-loop operations to control the end effector to pick the object, wherein to perform individual closed-loop operations of the plurality of closed-loop operations comprises to receive an updated image; encode the image to generate an updated encoded image; provide an encoded pick specification and the updated encoded image to the transformer network to generate an updated transformer vector output; provide the updated transformer vector output to the goal generator network to generate an updated target pose for the end effector of the robot; and control the end effector of the robot based on the updated target pose.

Example 3 includes the subject matter of any of Examples 1 and 2, and wherein to perform individual closed-loop operations of the plurality of closed-loop operations comprises to s determine an updated pick specification; and encode the updated pick specification to generate an updated encoded pick specification, wherein, for individual closed-loop operations of the plurality of closed-loop operations, to provide an encoded pick specification and the updated encoded image to the transformer network comprises to provide the updated encoded pick specification and the updated encoded image to the transformer network.

Example 4 includes the subject matter of any of Examples 1-3, and wherein, for individual closed-loop operations of the plurality of closed-loop operations, to determine an updated pick specification comprises to receive an update from an agent.

Example 5 includes the subject matter of any of Examples 1-4, and wherein the agent is another robot.

Example 6 includes the subject matter of any of Examples 1-5, and wherein to receive an update from an agent comprises to receive a spoken command from a human agent.

Example 7 includes the subject matter of any of Examples 1-6, and wherein individual closed-loop operations of the plurality of closed-loop operations are to be completed in less than one second.

Example 8 includes the subject matter of any of Examples 1-7, and wherein to provide the transformer vector output to the goal generator network to generate a target pose comprises to generate, by the goal generator network, a plurality of candidate poses for the end effector; rank, by the goal generator network, the plurality of candidate poses for the end effector; and select a highest-ranked candidate pose of the plurality of candidate poses for the target pose.

Example 9 includes the subject matter of any of Examples 1-8, and wherein the transformer network is a perceiver transformer neural network.

Example 10 includes the subject matter of any of Examples 1-9, and wherein the perceiver transformer neural network is agnostic as to the robot used to pick the object.

Example 11 includes the subject matter of any of Examples 1-10, and wherein the goal generator network is a continuous normalizing flow network.

Example 12 includes the subject matter of any of Examples 1-11, and wherein to encode the pick specification comprises to use a large language model to convert a text pick specification to a formatted pick specification corresponding to a template; and encode the formatted pick specification.

Example 13 includes the subject matter of any of Examples 1-12, and wherein the plurality of instructions further cause the processor to tune the large language model to understand robotic semantics and warehouse semantics.

Example 14 includes the subject matter of any of Examples 1-13, and wherein to control the end effector comprises to use a stochastic movement planner to control movement of the end effector.

Example 15 includes the subject matter of any of Examples 1-14, and wherein the pick specification comprises information from an order system about the object, information corresponding to a storage space for the object, and information from a warehouse operator or other agents.

Example 16 includes the subject matter of any of Examples 1-15, and wherein to receive the image comprises to capture the image with a camera of the compute device.

Example 17 includes the subject matter of any of Examples 1-16, and wherein the plurality of instructions further cause the processor to fully train the transformer network and the goal generator network in a simulation.

Example 18 includes a method comprising determining, by a compute device, a pick specification, wherein the pick specification comprises information about an object to be picked by a robot; receiving, by the compute device, an image; encoding, by the compute device, the pick specification to generate an encoded pick specification; encoding, by the compute device, the image to generate an encoded image; providing, by the compute device, the encoded pick specification and the encoded image to a transformer network to generate a transformer vector output; providing, by the compute device, the transformer vector output to a goal generator network to generate a target pose for an end effector of the robot; and controlling, by the compute device, the end effector of the robot based on the target pose.

Example 19 includes the subject matter of Example 18, and further including performing a plurality of closed-loop operations to control the end effector to pick the object, wherein individual closed-loop operations of the plurality of closed-loop operations comprises receiving, by the compute device, an updated image; encoding, by the compute device, the image to generate an updated encoded image; providing, by the compute device, an encoded pick specification and the updated encoded image to the transformer network to generate an updated transformer vector output; providing, by the compute device, the updated transformer vector output to the goal generator network to generate an updated target pose for the end effector of the robot; and controlling, by the compute device, the end effector of the robot based on the updated target pose.

Example 20 includes the subject matter of any of Examples 18 and 19, and wherein individual closed-loop operations of the plurality of closed-loop operations further comprises determining, by the compute device, an updated pick specification; and encoding, by the compute device, the updated pick specification to generate an updated encoded pick specification, wherein, for individual closed-loop operations of the plurality of closed-loop operations, providing an encoded pick specification and the updated encoded image to the transformer network comprises providing the updated encoded pick specification and the updated encoded image to the transformer network.

Example 21 includes the subject matter of any of Examples 18-20, and wherein, for individual closed-loop operations of the plurality of closed-loop operations, determining, by the compute device, an updated pick specification comprises receiving an update from an agent.

Example 22 includes the subject matter of any of Examples 18-21, and wherein the agent is another robot.

Example 23 includes the subject matter of any of Examples 18-22, and wherein receiving an update from an agent comprises receiving a spoken command from a human agent.

Example 24 includes the subject matter of any of Examples 18-23, and wherein individual closed-loop operations of the plurality of closed-loop operations are completed in less than one second.

Example 25 includes the subject matter of any of Examples 18-24, and wherein providing the transformer vector output to the goal generator network to generate a target pose comprises generating, by the goal generator network, a plurality of candidate poses for the end effector; ranking, by the goal generator network, the plurality of candidate poses for the end effector; and selecting a highest-ranked candidate pose of the plurality of candidate poses for the target pose.

Example 26 includes the subject matter of any of Examples 18-25, and wherein the transformer network is a perceiver transformer neural network.

Example 27 includes the subject matter of any of Examples 18-26, and wherein the perceiver transformer neural network is agnostic as to the robot used to pick the object.

Example 28 includes the subject matter of any of Examples 18-27, and wherein the goal generator network is a continuous normalizing flow network.

Example 29 includes the subject matter of any of Examples 18-28, and wherein encoding the pick specification comprises using a large language model to convert a text pick specification to a formatted pick specification corresponding to a template; and encoding the formatted pick specification.

Example 30 includes the subject matter of any of Examples 18-29, and further including tuning the large language model to understand robotic semantics and warehouse semantics.

Example 31 includes the subject matter of any of Examples 18-30, and wherein controlling the end effector comprises using a stochastic movement planner to control movement of the end effector.

Example 32 includes the subject matter of any of Examples 18-31, and wherein the pick specification comprises information from an order system about the object, information corresponding to a storage space for the object, and information from a warehouse operator or other agents.

Example 33 includes the subject matter of any of Examples 18-32, and wherein receiving the image comprises capturing the image with a camera of the compute device.

Example 34 includes the subject matter of any of Examples 18-33, and further including fully training the transformer network and the goal generator network in a simulation.

Example 35 includes a compute device comprising means for determining a pick specification, wherein the pick specification comprises information about an object to be picked by a robot; means for receiving an image; means for encoding the pick specification to generate an encoded pick specification; means for encoding the image to generate an encoded image; means for providing the encoded pick specification and the encoded image to a transformer network to generate a transformer vector output; means for providing the transformer vector output to a goal generator network to generate a target pose for an end effector of the robot; and means for controlling the end effector of the robot based on the target pose.

Example 36 includes the subject matter of Example 35, and further including means for performing a plurality of closed-loop operations to control the end effector to pick the object, wherein individual closed-loop operations of the plurality of closed-loop operations comprises means for receiving an updated image; means for encoding the image to generate an updated encoded image; means for providing an encoded pick specification and the updated encoded image to the transformer network to generate an updated transformer vector output; means for providing the updated transformer vector output to the goal generator network to generate an updated target pose for the end effector of the robot; and means for controlling the end effector of the robot based on the updated target pose.

Example 37 includes the subject matter of any of Examples 35 and 36, and wherein individual closed-loop operations of the plurality of closed-loop operations further comprises means for determining an updated pick specification; and means for encoding the updated pick specification to generate an updated encoded pick specification, wherein, for individual closed-loop operations of the plurality of closed-loop operations, the means for providing an encoded pick specification and the updated encoded image to the transformer network comprises means for providing the updated encoded pick specification and the updated encoded image to the transformer network.

Example 38 includes the subject matter of any of Examples 35-37, and wherein, for individual closed-loop operations of the plurality of closed-loop operations, the means for determining an updated pick specification comprises means for receiving an update from an agent.

Example 39 includes the subject matter of any of Examples 35-38, and wherein the agent is another robot.

Example 40 includes the subject matter of any of Examples 35-39, and wherein the means for receiving an update from an agent comprises means for receiving a spoken command from a human agent.

Example 41 includes the subject matter of any of Examples 35-40, and wherein individual closed-loop operations of the plurality of closed-loop operations are to be completed in less than one second.

Example 42 includes the subject matter of any of Examples 35-41, and wherein the means for providing the transformer vector output to the goal generator network to generate a target pose comprises means for generating, by the goal generator network, a plurality of candidate poses for the end effector; means for ranking, by the goal generator network, the plurality of candidate poses for the end effector; and means for selecting a highest-ranked candidate pose of the plurality of candidate poses for the target pose.

Example 43 includes the subject matter of any of Examples 35-42, and wherein the transformer network is a perceiver transformer neural network.

Example 44 includes the subject matter of any of Examples 35-43, and wherein the perceiver transformer neural network is agnostic as to the robot used to pick the object.

Example 45 includes the subject matter of any of Examples 35-44, and wherein the goal generator network is a continuous normalizing flow network.

Example 46 includes the subject matter of any of Examples 35-45, and wherein the means for encoding the pick specification comprises means for using a large language model to convert a text pick specification to a formatted pick specification corresponding to a template; and means for encoding the formatted pick specification.

Example 47 includes the subject matter of any of Examples 35-46, and further including means for tuning the large language model to understand robotic semantics and warehouse semantics.

Example 48 includes the subject matter of any of Examples 35-47, and wherein the means for controlling the end effector comprises means for using a stochastic movement planner to control movement of the end effector.

Example 49 includes the subject matter of any of Examples 35-48, and wherein the pick specification comprises information from an order system about the object, information corresponding to a storage space for the object, and information from a warehouse operator or other agents.

Example 50 includes the subject matter of any of Examples 35-49, and wherein the means for receiving the image comprises means for capturing the image with a camera of the compute device.

Example 51 includes the subject matter of any of Examples 35-50, and further including means for fully training the transformer network and the goal generator network in a simulation.

Example 52 includes one or more computer-readable media comprising a plurality of instructions stored thereon that, when executed, causes a compute device to determine a pick specification, wherein the pick specification comprises information about an object to be picked by a robot; receive an image; encode the pick specification to generate an encoded pick specification; encode the image to generate an encoded image; provide the encoded pick specification and the encoded image to a transformer network to generate a transformer vector output; provide the transformer vector output to a goal generator network to generate a target pose for an end effector of the robot; and control the end effector of the robot based on the target pose.

Example 53 includes the subject matter of Example 52, and wherein the plurality of instructions further cause the compute device to perform a plurality of closed-loop operations to control the end effector to pick the object, wherein to perform individual closed-loop operations of the plurality of closed-loop operations comprises to receive an updated image; encode the image to generate an updated encoded image; provide an encoded pick specification and the updated encoded image to the transformer network to generate an updated transformer vector output; provide the updated transformer vector output to the goal generator network to generate an updated target pose for the end effector of the robot; and control the end effector of the robot based on the updated target pose.

Example 54 includes the subject matter of any of Examples 52 and 53, and wherein to perform individual closed-loop operations of the plurality of closed-loop operations comprises to s determine an updated pick specification; and encode the updated pick specification to generate an updated encoded pick specification, wherein, for individual closed-loop operations of the plurality of closed-loop operations, to provide an encoded pick specification and the updated encoded image to the transformer network comprises to provide the updated encoded pick specification and the updated encoded image to the transformer network.

Example 55 includes the subject matter of any of Examples 52-54, and wherein, for individual closed-loop operations of the plurality of closed-loop operations, to determine an updated pick specification comprises to receive an update from an agent.

Example 56 includes the subject matter of any of Examples 52-55, and wherein the agent is another robot.

Example 57 includes the subject matter of any of Examples 52-56, and wherein to receive an update from an agent comprises to receive a spoken command from a human agent.

Example 58 includes the subject matter of any of Examples 52-57, and wherein individual closed-loop operations of the plurality of closed-loop operations are to be completed in less than one second.

Example 59 includes the subject matter of any of Examples 52-58, and wherein to provide the transformer vector output to the goal generator network to generate a target pose comprises to generate, by the goal generator network, a plurality of candidate poses for the end effector; rank, by the goal generator network, the plurality of candidate poses for the end effector; and select a highest-ranked candidate pose of the plurality of candidate poses for the target pose.

Example 60 includes the subject matter of any of Examples 52-59, and wherein the transformer network is a perceiver transformer neural network.

Example 61 includes the subject matter of any of Examples 52-60, and wherein the perceiver transformer neural network is agnostic as to the robot used to pick the object.

Example 62 includes the subject matter of any of Examples 52-61, and wherein the goal generator network is a continuous normalizing flow network.

Example 63 includes the subject matter of any of Examples 52-62, and wherein to encode the pick specification comprises to use a large language model to convert a text pick specification to a formatted pick specification corresponding to a template; and encode the formatted pick specification.

Example 64 includes the subject matter of any of Examples 52-63, and wherein the plurality of instructions further cause the compute device to tune the large language model to understand robotic semantics and warehouse semantics.

Example 65 includes the subject matter of any of Examples 52-64, and wherein to control the end effector comprises to use a stochastic movement planner to control movement of the end effector.

Example 66 includes the subject matter of any of Examples 52-65, and wherein the pick specification comprises information from an order system about the object, information corresponding to a storage space for the object, and information from a warehouse operator or other agents.

Example 67 includes the subject matter of any of Examples 52-66, and wherein to receive the image comprises to capture the image with a camera of the compute device.

Example 68 includes the subject matter of any of Examples 52-67, and wherein the plurality of instructions further cause the compute device to fully train the transformer network and the goal generator network in a simulation.

Example 69 includes a compute device comprising a processor; and data storage coupled to the processor, the data storage comprising thereon a plurality of instructions that, when executed, causes the processor to control a robot to pick an object in a warehouse, wherein to control the robot to pick the object comprises to perform a plurality of closed-loop operations, wherein to perform individual closed-loop operations of the plurality of closed-loop operations comprises to operate a perceiver transformer, wherein an input to the perceiver transformer is indicative of geometry of objects in a field of view of a camera, wherein an output of the perceiver transformer is indicative of an object to be manipulated; generate a target pose of an end effector of the robot based on the output; and control the end effector of the robot based on the target pose.

Example 70 includes the subject matter of Example 69, and wherein to perform individual closed-loop operations of the plurality of closed-loop operations comprises to receive an image; encode the image to generate an encoded image; and provide an encoded pick specification and the encoded image to the perceiver transformer to generate an updated output of the perceiver transformer.

Example 71 includes the subject matter of any of Examples 69 and 70, and wherein to perform individual closed-loop operations of the plurality of closed-loop operations further comprises to determine an update to a pick specification, wherein the pick specification comprises information about an object to be picked by a robot; and encode the pick specification to generate the encoded pick specification.

Example 72 includes the subject matter of any of Examples 69-71, and wherein, for individual closed-loop operations of the plurality of closed-loop operations, to determine an update to the pick specification comprises to receive an update from an agent.

Example 73 includes the subject matter of any of Examples 69-72, and wherein the agent is another robot.

Example 74 includes the subject matter of any of Examples 69-73, and wherein to receive an update from an agent comprises to receive a spoken command from a human agent.

Example 75 includes the subject matter of any of Examples 69-74, and wherein to encode the pick specification comprises to use a large language model to convert a text pick specification to a formatted pick specification corresponding to a template; and encode the formatted pick specification.

Example 76 includes the subject matter of any of Examples 69-75, and wherein the pick specification comprises information from an order system about the object, information corresponding to a storage space for the object, and information from a warehouse operator or other agents.

Example 77 includes the subject matter of any of Examples 69-76, and wherein the plurality of instructions further cause the processor to tune the large language model to understand robotic semantics and warehouse semantics.

Example 78 includes the subject matter of any of Examples 69-77, and wherein to receive the image comprises to capture the image with a camera of the compute device.

Example 79 includes the subject matter of any of Examples 69-78, and wherein individual closed-loop operations of the plurality of closed-loop operations are to be completed in less than one second.

Example 80 includes the subject matter of any of Examples 69-79, and wherein to generate the target pose comprises generate, by a goal generator network, a plurality of candidate poses for the end effector; rank, by the goal generator network, the plurality of candidate poses for the end effector; and select a highest-ranked candidate pose of the plurality of candidate poses for the target pose.

Example 81 includes the subject matter of any of Examples 69-80, and wherein the goal generator network is a continuous normalizing flow network.

Example 82 includes the subject matter of any of Examples 69-81, and wherein the perceiver transformer is agnostic as to the robot used to pick the object.

Example 83 includes the subject matter of any of Examples 69-82, and wherein to control the end effector comprises to use a stochastic movement planner to control movement of the end effector.

Example 84 includes the subject matter of any of Examples 69-83, and wherein the plurality of instructions further cause the processor to fully train the perceiver transformer in a simulation.

Example 85 includes a method comprising controlling, by a compute device, a robot to pick an object in a warehouse, wherein controlling the robot to pick the object comprises performing a plurality of closed-loop operations, wherein individual closed-loop operations of the plurality of closed-loop operations comprise operating, by the compute device, a perceiver transformer, wherein an input to the perceiver transformer is indicative of geometry of objects in a field of view of a camera, wherein an output of the perceiver transformer is indicative of an object to be manipulated; generating, by the compute device, a target pose of an end effector of the robot based on the output; and controlling, by the compute device, the end effector of the robot based on the target pose.

Example 86 includes the subject matter of Example 85, and wherein individual closed-loop operations of the plurality of closed-loop operations comprises receiving, by the compute device, an image; encoding, by the compute device, the image to generate an encoded image; and providing, by the compute device, an encoded pick specification and the encoded image to the perceiver transformer to generate an updated output of the perceiver transformer.

Example 87 includes the subject matter of any of Examples 85 and 86, and wherein individual closed-loop operations of the plurality of closed-loop operations further comprises determining, by the compute device, an update to a pick specification, wherein the pick specification comprises information about an object to be picked by a robot; and encoding, by the compute device, the pick specification to generate the encoded pick specification.

Example 88 includes the subject matter of any of Examples 85-87, and wherein, for individual closed-loop operations of the plurality of closed-loop operations, determining, by the compute device, an update to the pick specification comprises receiving an update from an agent.

Example 89 includes the subject matter of any of Examples 85-88, and wherein the agent is another robot.

Example 90 includes the subject matter of any of Examples 85-89, and wherein receiving an update from an agent comprises receiving a spoken command from a human agent.

Example 91 includes the subject matter of any of Examples 85-90, and wherein encoding the pick specification comprises using a large language model to convert a text pick specification to a formatted pick specification corresponding to a template; and encoding the formatted pick specification.

Example 92 includes the subject matter of any of Examples 85-91, and further including tuning the large language model to understand robotic semantics and warehouse semantics.

Example 93 includes the subject matter of any of Examples 85-92, and wherein the pick specification comprises information from an order system about the object, information corresponding to a storage space for the object, and information from a warehouse operator or other agents.

Example 94 includes the subject matter of any of Examples 85-93, and wherein receiving the image comprises capturing the image with a camera of the compute device.

Example 95 includes the subject matter of any of Examples 85-94, and wherein individual closed-loop operations of the plurality of closed-loop operations are completed in less than one second.

Example 96 includes the subject matter of any of Examples 85-95, and wherein generating the target pose comprises generating, by a goal generator network, a plurality of candidate poses for the end effector; ranking, by the goal generator network, the plurality of candidate poses for the end effector; and selecting a highest-ranked candidate pose of the plurality of candidate poses for the target pose.

Example 97 includes the subject matter of any of Examples 85-96, and wherein the goal generator network is a continuous normalizing flow network.

Example 98 includes the subject matter of any of Examples 85-97, and wherein the perceiver transformer is agnostic as to the robot used to pick the object.

Example 99 includes the subject matter of any of Examples 85-98, and wherein controlling the end effector comprises using a stochastic movement planner to control movement of the end effector.

Example 100 includes the subject matter of any of Examples 85-99, and further including fully training the perceiver transformer in a simulation.

Example 101 includes one or more computer-readable media comprising a plurality of instructions stored thereon that, when executed, causes a compute device to perform the method of any of Examples 85-100.

Example 102 includes a compute device comprising means to perform the method of any of Examples 85-100.

Example 103 includes a compute device comprising means for controlling, by a compute device, a robot to pick an object in a warehouse, wherein the means for controlling the robot to pick the object comprises means for performing a plurality of closed-loop operations, wherein the means for performing individual closed-loop operations of the plurality of closed-loop operations comprise means for operating a perceiver transformer, wherein an input to the perceiver transformer is indicative of geometry of objects in a field of view of a camera, wherein an output of the perceiver transformer is indicative of an object to be manipulated; means for generating a target pose of an end effector of the robot based on the output; and means for controlling the end effector of the robot based on the target pose.

Example 104 includes the subject matter of Example 103, and wherein the means for performing individual closed-loop operations of the plurality of closed-loop operations comprises means for receiving an image; means for encoding the image to generate an encoded image; and means for providing an encoded pick specification and the encoded image to the perceiver transformer to generate an updated output of the perceiver transformer.

Example 105 includes the subject matter of any of Examples 103 and 104, and wherein the means for performing individual closed-loop operations of the plurality of closed-loop operations further comprises means for determining an update to a pick specification, wherein the pick specification comprises information about an object to be picked by a robot; and means for encoding the pick specification to generate the encoded pick specification.

Example 106 includes the subject matter of any of Examples 103-105, and wherein, for individual closed-loop operations of the plurality of closed-loop operations, the means for determining an update to the pick specification comprises means for receiving an update from an agent.

Example 107 includes the subject matter of any of Examples 103-106, and wherein the agent is another robot.

Example 108 includes the subject matter of any of Examples 103-107, and wherein the means for receiving an update from an agent comprises means for receiving a spoken command from a human agent.

Example 109 includes the subject matter of any of Examples 103-108, and wherein the means for encoding the pick specification comprises means for using a large language model to convert a text pick specification to a formatted pick specification corresponding to a template; and means for encoding the formatted pick specification.

Example 110 includes the subject matter of any of Examples 103-109, and further including means for tuning the large language model to understand robotic semantics and warehouse semantics.

Example 111 includes the subject matter of any of Examples 103-110, and wherein the pick specification comprises information from an order system about the object, information corresponding to a storage space for the object, and information from a warehouse operator or other agents.

Example 112 includes the subject matter of any of Examples 103-111, and wherein the means for receiving the image comprises means for capturing the image with a camera of the compute device.

Example 113 includes the subject matter of any of Examples 103-112, and wherein individual closed-loop operations of the plurality of closed-loop operations are to be completed in less than one second.

Example 114 includes the subject matter of any of Examples 103-113, and wherein the means for generating the target pose comprises means for generating, by a goal generator network, a plurality of candidate poses for the end effector; means for ranking, by the goal generator network, the plurality of candidate poses for the end effector; and means for selecting a highest-ranked candidate pose of the plurality of candidate poses for the target pose.

Example 115 includes the subject matter of any of Examples 103-114, and wherein the goal generator network is a continuous normalizing flow network.

Example 116 includes the subject matter of any of Examples 103-115, and wherein the perceiver transformer is agnostic as to the robot used to pick the object.

Example 117 includes the subject matter of any of Examples 103-116, and wherein the means for controlling the end effector comprises means for using a stochastic movement planner to control movement of the end effector.

Example 118 includes the subject matter of any of Examples 103-117, and further including means for fully training the perceiver transformer in a simulation.

Example 119 includes one or more computer-readable media comprising a plurality of instructions stored thereon that, when executed, causes a compute device to control a robot to pick an object in a warehouse, wherein to control the robot to pick the object comprises to perform a plurality of closed-loop operations, wherein to perform individual closed-loop operations of the plurality of closed-loop operations comprises to operate a perceiver transformer, wherein an input to the perceiver transformer is indicative of geometry of objects in a field of view of a camera, wherein an output of the perceiver transformer is indicative of an object to be manipulated; generate a target pose of an end effector of the robot based on the output; and control the end effector of the robot based on the target pose.

Example 120 includes the subject matter of Example 119, and wherein to perform individual closed-loop operations of the plurality of closed-loop operations comprises to receive an image; encode the image to generate an encoded image; and provide an encoded pick specification and the encoded image to the perceiver transformer to generate an updated output of the perceiver transformer.

Example 121 includes the subject matter of any of Examples 119 and 120, and wherein to perform individual closed-loop operations of the plurality of closed-loop operations further comprises to determine an update to a pick specification, wherein the pick specification comprises information about an object to be picked by a robot; and encode the pick specification to generate the encoded pick specification.

Example 122 includes the subject matter of any of Examples 119-121, and wherein, for individual closed-loop operations of the plurality of closed-loop operations, to determine an update to the pick specification comprises to receive an update from an agent.

Example 123 includes the subject matter of any of Examples 119-122, and wherein the agent is another robot.

Example 124 includes the subject matter of any of Examples 119-123, and wherein to receive an update from an agent comprises to receive a spoken command from a human agent.

Example 125 includes the subject matter of any of Examples 119-124, and wherein to encode the pick specification comprises to use a large language model to convert a text pick specification to a formatted pick specification corresponding to a template; and encode the formatted pick specification.

Example 126 includes the subject matter of any of Examples 119-125, and wherein the plurality of instructions further cause the compute device to tune the large language model to understand robotic semantics and warehouse semantics.

Example 127 includes the subject matter of any of Examples 119-126, and wherein the pick specification comprises information from an order system about the object, information corresponding to a storage space for the object, and information from a warehouse operator or other agents.

Example 128 includes the subject matter of any of Examples 119-127, and wherein to receive the image comprises to capture the image with a camera of the compute device.

Example 129 includes the subject matter of any of Examples 119-128, and wherein individual closed-loop operations of the plurality of closed-loop operations are to be completed in less than one second.

Example 130 includes the subject matter of any of Examples 119-129, and wherein to generate the target pose comprises generate, by a goal generator network, a plurality of candidate poses for the end effector; rank, by the goal generator network, the plurality of candidate poses for the end effector; and select a highest-ranked candidate pose of the plurality of candidate poses for the target pose.

Example 131 includes the subject matter of any of Examples 119-130, and wherein the goal generator network is a continuous normalizing flow network.

Example 132 includes the subject matter of any of Examples 119-131, and wherein the perceiver transformer is agnostic as to the robot used to pick the object.

Example 133 includes the subject matter of any of Examples 119-132, and wherein to control the end effector comprises to use a stochastic movement planner to control movement of the end effector.

Example 134 includes the subject matter of any of Examples 119-133, and wherein the plurality of instructions further cause the compute device to fully train the perceiver transformer in a simulation.

The invention claimed is:

1. A compute device comprising:
   a processor; and
   data storage coupled to the processor, the data storage comprising thereon a plurality of instructions that, when executed, causes the processor to:
      determine a pick specification, wherein the pick specification comprises information about an object to be picked by a robot;
      receive an image;
      encode the pick specification to generate an encoded pick specification;
      encode the image to generate an encoded image;
      provide the encoded pick specification and the encoded image to a transformer network to generate a transformer vector output;
      provide the transformer vector output to a goal generator network to generate a target pose for an end effector of the robot; and
      control the end effector of the robot based on the target pose.

2. The compute device of claim 1, wherein the plurality of instructions further cause the processor to perform a plurality of closed-loop operations to control the end effector to pick the object, wherein to perform individual closed-loop operations of the plurality of closed-loop operations comprises to:
   receive an updated image;
   encode the image to generate an updated encoded image;
   provide an encoded pick specification and the updated encoded image to the transformer network to generate an updated transformer vector output;
   provide the updated transformer vector output to the goal generator network to generate an updated target pose for the end effector of the robot; and
   control the end effector of the robot based on the updated target pose.

3. The compute device of claim 2, wherein to perform individual closed-loop operations of the plurality of closed-loop operations comprises to s:
   determine an updated pick specification; and
   encode the updated pick specification to generate an updated encoded pick specification,
   wherein, for individual closed-loop operations of the plurality of closed-loop operations, to provide an encoded pick specification and the updated encoded image to the transformer network comprises to provide the updated encoded pick specification and the updated encoded image to the transformer network.

4. The compute device of claim 3, wherein, for individual closed-loop operations of the plurality of closed-loop operations, to determine an updated pick specification comprises to receive an update from an agent.

5. The compute device of claim 4, wherein the agent is another robot.

6. The compute device of claim 4, wherein to receive an update from an agent comprises to receive a spoken command from a human agent.

7. The compute device of claim 2, wherein individual closed-loop operations of the plurality of closed-loop operations are to be completed in less than one second.

8. The compute device of claim 1, wherein to provide the transformer vector output to the goal generator network to generate a target pose comprises to:
  generate, by the goal generator network, a plurality of candidate poses for the end effector;
  rank, by the goal generator network, the plurality of candidate poses for the end effector; and
  select a highest-ranked candidate pose of the plurality of candidate poses for the target pose.

9. The compute device of claim 1, wherein the transformer network is a perceiver transformer neural network.

10. The compute device of claim 9, wherein the perceiver transformer neural network is agnostic as to the robot used to pick the object.

11. The compute device of claim 1, wherein the goal generator network is a continuous normalizing flow network.

12. The compute device of claim 1, wherein the pick specification comprises information from an order system about the object, information corresponding to a storage space for the object, and information from a warehouse operator or other agents.

13. One or more non-transitory computer-readable media comprising a plurality of instructions stored thereon that, when executed, causes a compute device to:
  determine a pick specification, wherein the pick specification comprises information about an object to be picked by a robot;
  receive an image;
  encode the pick specification to generate an encoded pick specification;
  encode the image to generate an encoded image;
  provide the encoded pick specification and the encoded image to a transformer network to generate a transformer vector output;
  provide the transformer vector output to a goal generator network to generate a target pose for an end effector of the robot; and
  control the end effector of the robot based on the target pose.

14. The one or more non-transitory computer-readable media of claim 13, wherein the plurality of instructions further cause the compute device to perform a plurality of closed-loop operations to control the end effector to pick the object, wherein to perform individual closed-loop operations of the plurality of closed-loop operations comprises to:
  receive an updated image;
  encode the image to generate an updated encoded image;
  provide an encoded pick specification and the updated encoded image to the transformer network to generate an updated transformer vector output;
  provide the updated transformer vector output to the goal generator network to generate an updated target pose for the end effector of the robot; and
  control the end effector of the robot based on the updated target pose.

15. The one or more non-transitory computer-readable media of claim 14, wherein to perform individual closed-loop operations of the plurality of closed-loop operations comprises to s:
  determine an updated pick specification; and
  encode the updated pick specification to generate an updated encoded pick specification,
  wherein, for individual closed-loop operations of the plurality of closed-loop operations, to provide an encoded pick specification and the updated encoded image to the transformer network comprises to provide the updated encoded pick specification and the updated encoded image to the transformer network.

16. The one or more non-transitory computer-readable media of claim 13, wherein to encode the pick specification comprises to:
  use a large language model to convert a text pick specification to a formatted pick specification corresponding to a template; and
  encode the formatted pick specification.

17. The one or more non-transitory computer-readable media of claim 16, wherein the plurality of instructions further cause the compute device to tune the large language model to understand robotic semantics and warehouse semantics.

18. A compute device comprising:
  a processor; and
  data storage coupled to the processor, the data storage comprising thereon a plurality of instructions that, when executed, causes the processor to:
    control a robot to pick an object in a warehouse, wherein to control the robot to pick the object comprises to perform a plurality of closed-loop operations, wherein to perform individual closed-loop operations of the plurality of closed-loop operations comprises to:
      operate a perceiver transformer, wherein an input to the perceiver transformer is indicative of geometry of objects in a field of view of a camera, wherein an output of the perceiver transformer is indicative of an object to be manipulated;
      generate a target pose of an end effector of the robot based on the output; and
      control the end effector of the robot based on the target pose.

19. The compute device of claim 18, wherein to perform individual closed-loop operations of the plurality of closed-loop operations comprises to:
  receive an image;
  encode the image to generate an encoded image; and
  provide an encoded pick specification and the encoded image to the perceiver transformer to generate an updated output of the perceiver transformer.

20. The compute device of claim 19, wherein to perform individual closed-loop operations of the plurality of closed-loop operations further comprises to:
  determine an update to a pick specification, wherein the pick specification comprises information about an object to be picked by a robot; and
  encode the pick specification to generate the encoded pick specification.

* * * * *